(12) United States Patent
Skluzacek et al.

(10) Patent No.: US 8,573,858 B2
(45) Date of Patent: Nov. 5, 2013

(54) FIELD TERMINABLE FIBER OPTIC CONNECTOR ASSEMBLY

(75) Inventors: Kenneth Allen Skluzacek, Belle Plaine, MN (US); Wagner Da Silva Aguiar, Brunswick, NY (US); Jarrod Scadden, Hopkins, MN (US); Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 268 days.

(21) Appl. No.: 12/789,139

(22) Filed: May 27, 2010

(65) Prior Publication Data

US 2011/0019963 A1 Jan. 27, 2011

Related U.S. Application Data

(60) Provisional application No. 61/182,184, filed on May 29, 2009.

(51) Int. Cl.
*G02B 6/36* (2006.01)
*G02B 6/38* (2006.01)

(52) U.S. Cl.
USPC ............ 385/80; 385/56; 385/57; 385/60; 385/65; 385/66; 385/69; 385/75; 385/76; 385/77; 385/78; 385/83; 385/84; 385/86

(58) Field of Classification Search
USPC .......................... 385/69, 75, 80, 86
See application file for complete search history.

(56) References Cited

U.S. PATENT DOCUMENTS

| | | | |
|---|---|---|---|
| 5,341,448 A | 8/1994 | Huebscher | |
| 5,883,995 A | 3/1999 | Lu | |
| 6,142,676 A | 11/2000 | Lu | |
| 6,811,323 B2 * | 11/2004 | Murray et al. | 385/80 |
| 7,530,746 B2 | 5/2009 | Kachmar | |
| 7,534,050 B2 * | 5/2009 | Kachmar | 385/55 |
| 7,676,134 B2 | 3/2010 | Kachmar | |
| 2008/0285922 A1 | 11/2008 | Kachmar | |
| 2009/0269011 A1 | 10/2009 | Scadden et al. | |
| 2010/0119197 A1 * | 5/2010 | Scadden et al. | 385/96 |

FOREIGN PATENT DOCUMENTS

| | | |
|---|---|---|
| EP | 1 612 589 A1 | 1/2006 |
| JP | 58-75104 | 5/1983 |
| WO | WO 01/96923 A1 | 12/2001 |
| WO | WO 2008/051030 A1 | 5/2008 |

OTHER PUBLICATIONS

International Search Report and Written Opinion for PCT/US2009/050200 mailed Nov. 11, 2009.

* cited by examiner

*Primary Examiner* — Ryan Lepisto
(74) *Attorney, Agent, or Firm* — Merchant & Gould P.C.

(57) ABSTRACT

An assembly includes a connector and a carrier engaged therewith. Connector has a first mating end and a second end and a first fiber. The fiber defines a first end adjacent the mating end and a second end protruding from the connector second end. Carrier has a connector end and an opposite cable end and includes a heat activated meltable portion adjacent the cable end. An alignment structure is on the carrier and includes first and second ends, and a throughhole. The first end of the alignment structure receives the second end of the first fiber and the second end receives an end of a second fiber entering the carrier. The heat activated portion melts and assumes a flowable condition when exposed to a predetermined amount of heat and resolidifies when heat is removed, bonding the second fiber to the carrier after the first and second fibers are aligned.

17 Claims, 33 Drawing Sheets

1012

1012

FIELD TERMINABLE FIBER OPTIC CONNECTOR ASSEMBLY

CROSS REFERENCE TO RELATED APPLICATION

This application claims the benefit of U.S. Provisional Patent Application Ser. No. 61/182,184, filed May 29, 2009, which application is hereby incorporated by reference in its entirety.

TECHNICAL FIELD

The present disclosure relates to a fiber optic connector assembly, and more particularly, to a field terminable fiber optic connector assembly.

BACKGROUND

The use of fiber optic networks as a signal-carrying medium for communications is now widespread and continues to increase. Fiber optic networks frequently include a plurality of fiber optic cables having optical fibers. As fiber optic networks continue to grow, the need for optical fiber terminations for maintenance or expansion purposes is also growing. As such, there is a need for an optical fiber termination which can be performed in the field.

SUMMARY

An aspect of the present disclosure relates to a fiber optic connector assembly that includes a connector and a carrier. The connector has a first mating end and a second end and a first optical fiber terminated thereto. The fiber defines a first end adjacent the mating end and a second end protruding from the second end of the connector. A polymeric carrier having a connector end and an oppositely disposed cable end is engaged with the connector. The carrier includes a heat activated meltable portion adjacent the cable end. The meltable portion is configured to melt and assume a flowable condition. An alignment structure is disposed on the carrier that includes a first end, a second end, and a throughhole. The first end of the alignment structure is for receiving the second end of the first optical fiber and the second end of the alignment structure is for receiving an end of a second optical fiber entering the cable end of the carrier. The heat activated portion of the carrier is configured to melt and assume a flowable condition when exposed to a predetermined amount of heat and resolidify when the heat is removed for bonding the second optical fiber to the carrier after the first fiber is aligned with the second fiber. Thermal energy may be applied to the polymeric carrier to melt the heat activated portion of the carrier.

According to another aspect of the disclosure, the portion of the polymeric carrier that is to be melted is positioned such that, when melted, the polymeric material contacts at least a portion of the second optical fiber entering the cable end of the carrier. After a predetermined time, the heat source is removed allowing the polymeric material to solidify. Once the material is solid, the contacted fiber is secured to the carrier. Other parts of the fiber optic connector assembly such as the alignment structure may also be secured to the carrier once the melted portions of the carrier solidify.

According to another aspect of the disclosure, the polymeric carrier with the meltable portion may be utilized in combination with a heat activated adhesive element for the bonding.

According to yet another aspect of the disclosure, various heat sources may be utilized to provide the thermal energy to the polymeric carrier and/or heat activated adhesive element. The heat sources may include arrangements such as a resistor in contact with a conductive element that is in contact with the polymeric carrier and/or the adhesive element. The heat sources may also include tools such as a solder iron in direct contact with the conductive element that is in contact with the polymeric carrier and/or the heat adhesive element.

Another aspect of the disclosure relates to a fiber optic termination assembly comprising a support structure having a first end and an oppositely disposed second end, the support structure configured to receive a first optical fiber from the first end and a second optical fiber from the second end. An alignment structure is disposed on the support structure, the alignment structure including a first end and a second end and a throughhole extending from the first end to the second end, the alignment structure including a cutaway portion extending generally perpendicularly to and communicating with the throughhole. The first optical fiber enters the alignment structure from the first end and is positioned within at least a portion of the throughhole with an end of the first optical fiber being located within the cutaway portion of the alignment structure. The second optical fiber enters the alignment structure from the second end and is positioned within at least a portion of the throughhole with an end of the second optical fiber being located within the cutaway portion of the alignment structure. A window is disposed within the cutaway portion of the alignment structure over the ends of the first and second optic fibers, the window configured for visually inspecting an alignment of the end of the first optical fiber with the end of the second optical fiber. A first thermally conductive element is positioned between the first end of the support structure and the alignment structure and a second thermally conductive element is positioned between the second end of the support structure and the alignment structure, the first thermally conductive element configured to transfer heat for melting a heat activated element to bond the first optical fiber to the support structure and the second thermally conductive element configured to transfer heat for melting a heat activated element to bond the second optical fiber to the support structure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the inventive aspects of the present disclosure and are incorporated in and constitute a part of this specification. The drawings illustrate exemplary embodiments of the present disclosure and together with the description serve to further explain the principles of the disclosure. Other aspects of the present disclosure and many of the advantages of the present disclosure will be readily appreciated as the present disclosure becomes better understood by reference to the following Detailed Description when considered in connection with the accompanying drawings, and wherein.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

Figure 1:
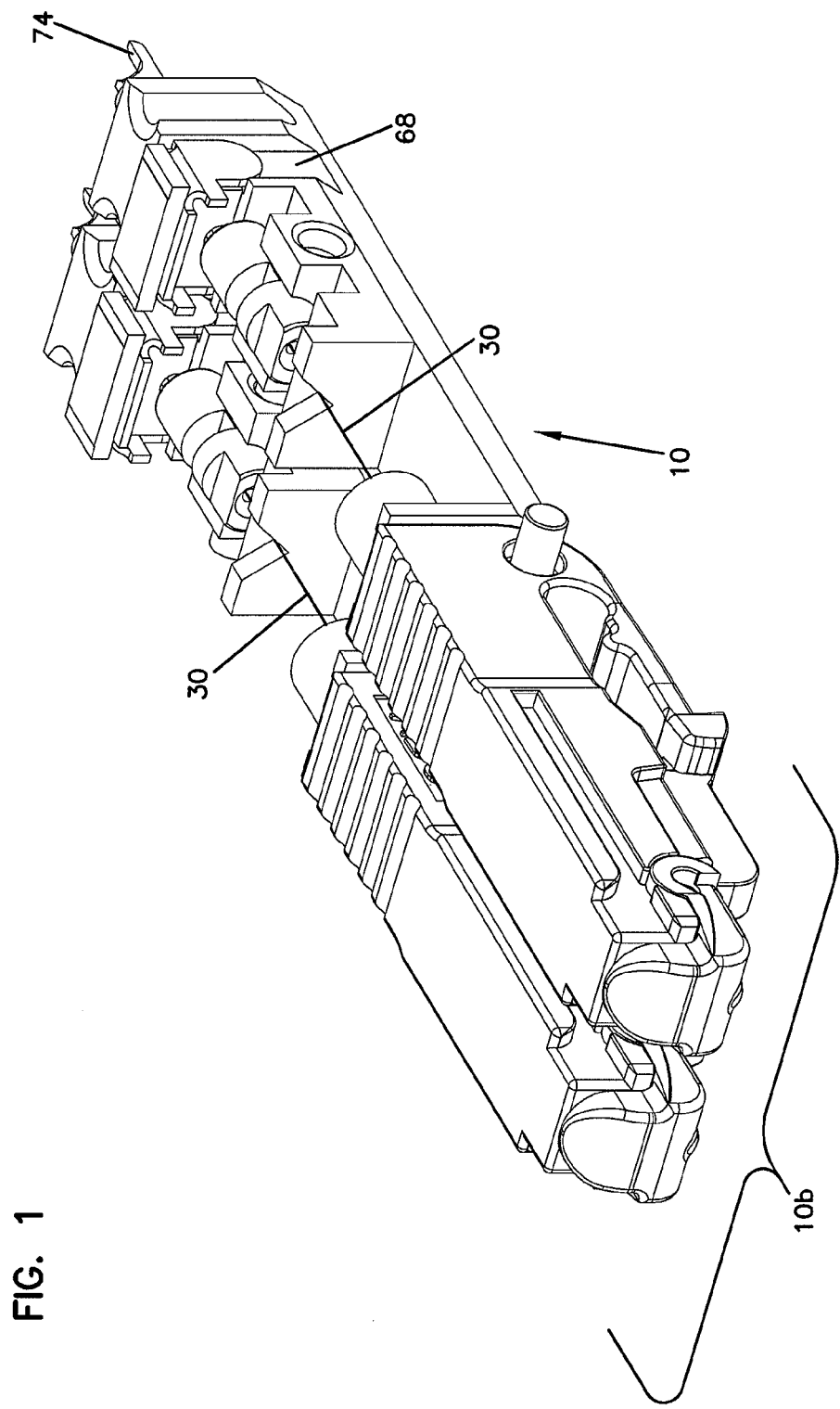
FIG. 1 is a perspective view of a fiber optic connector assembly having features that are examples of inventive aspects in accordance with the principles of the present disclosure, the fiber optic connector assembly shown in a fully assembled configuration.
Figure 1A:
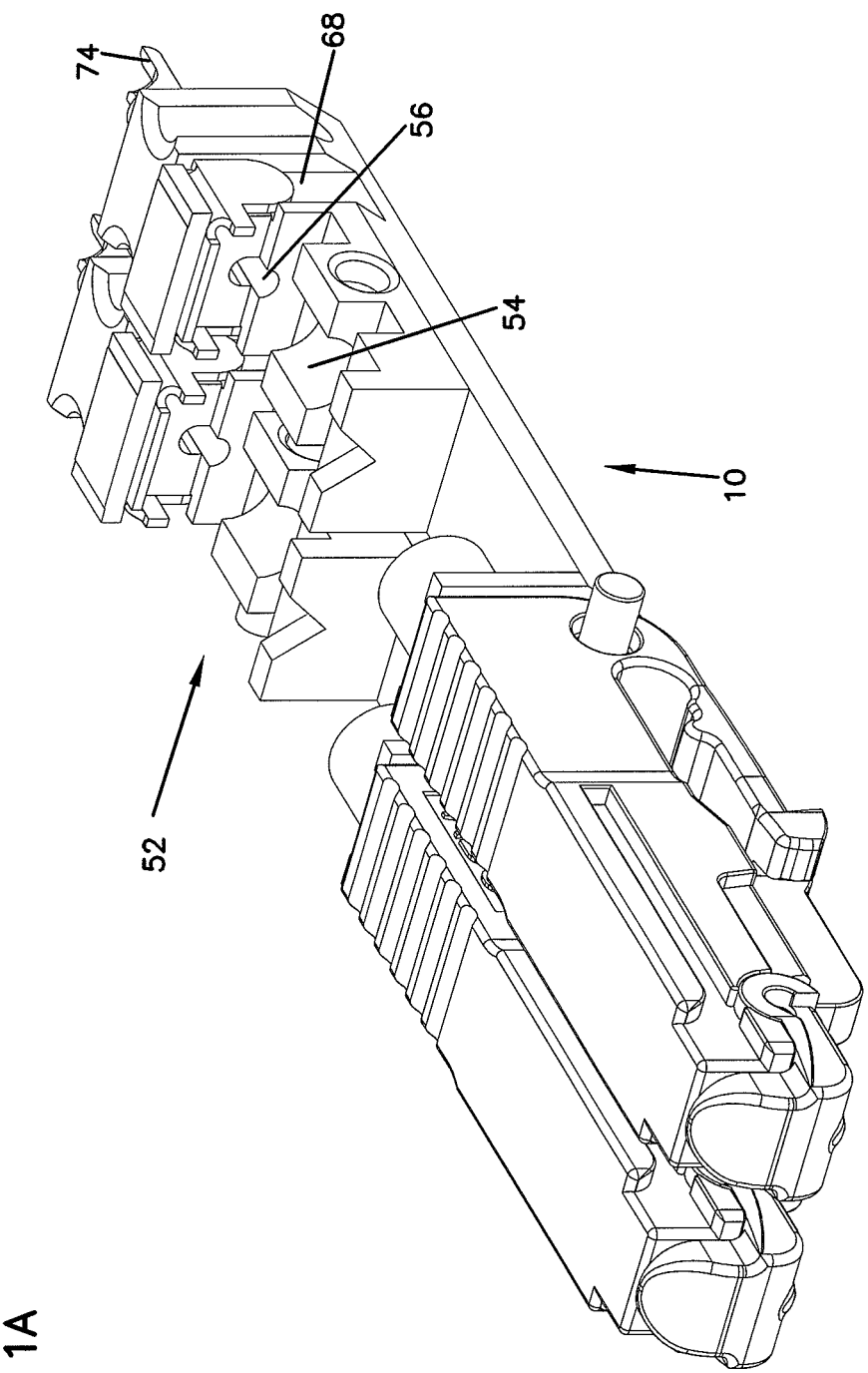
FIG. 1A illustrates the fiber optic connector assembly of FIG. 1 with the alignment guide of the assembly removed.
Figure 2:
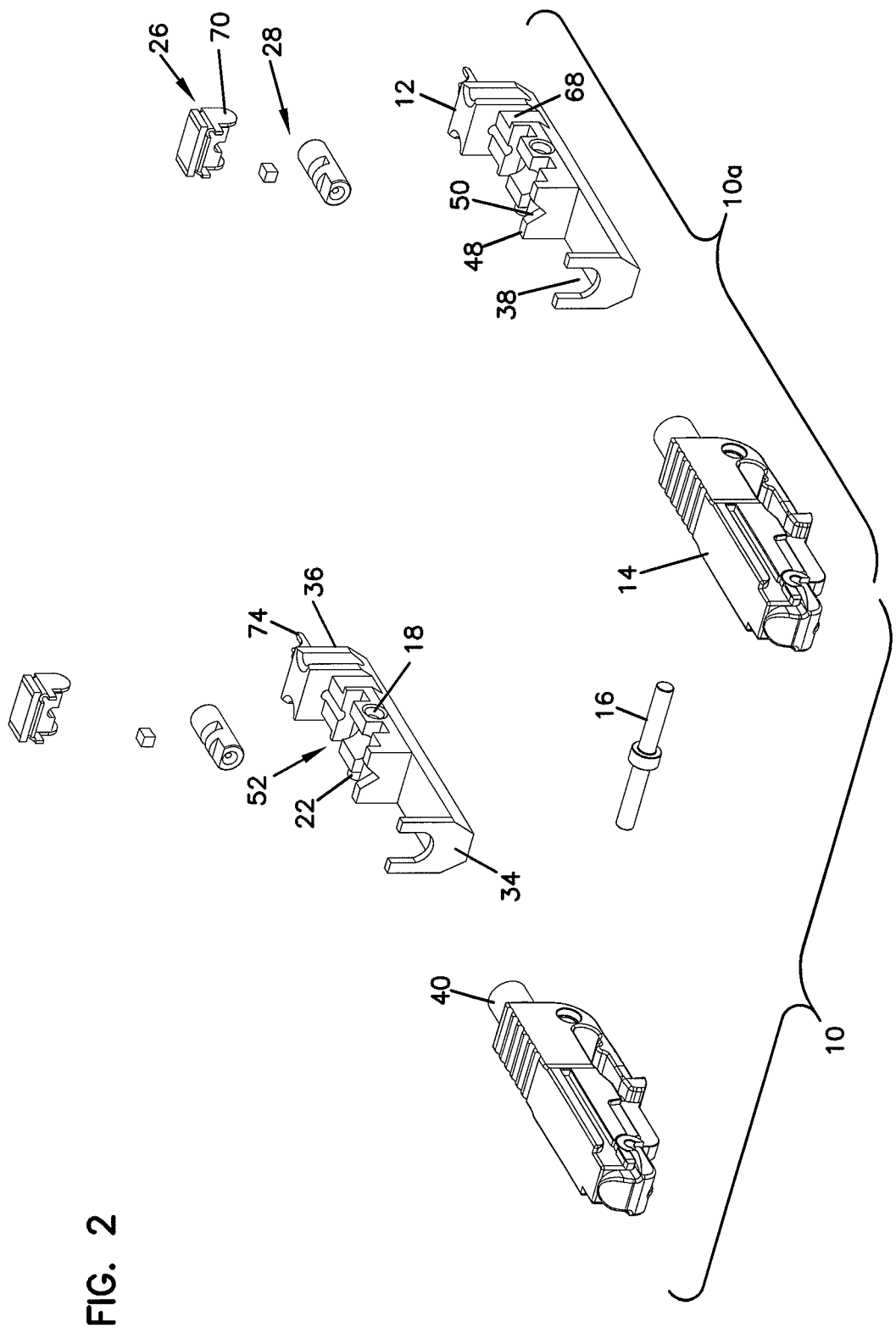
FIG. 2 is a fully exploded view of the fiber optic connector assembly of FIG. 1.
Figure 2A:
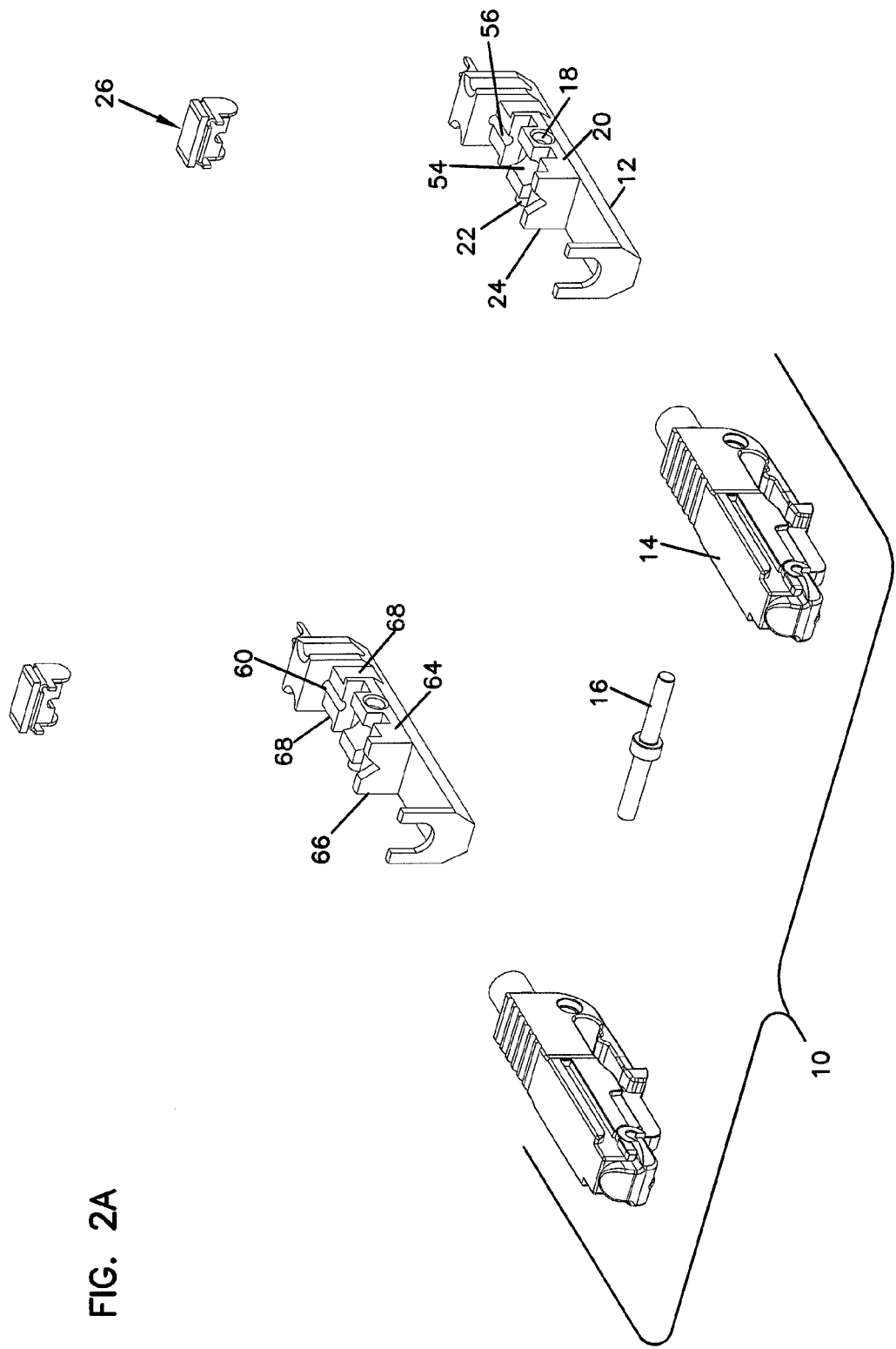
FIG. 2A illustrates the exploded view of the fiber optic connector assembly of FIG. 1A.
Figure 3:
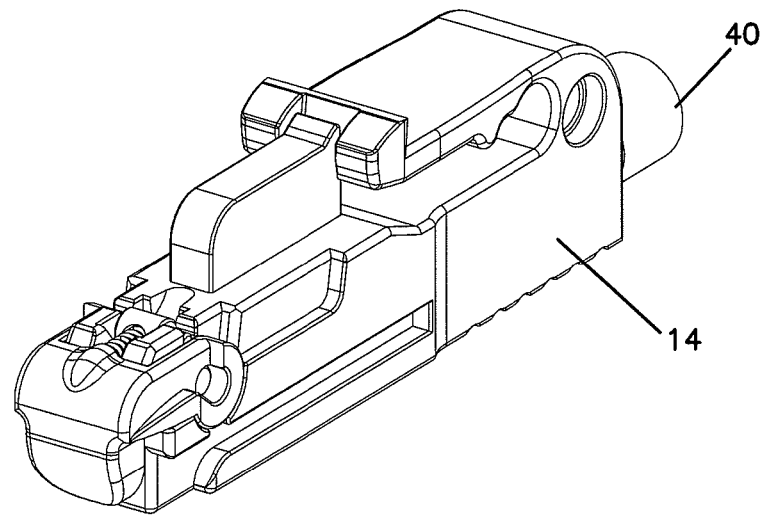
FIG. 3 is a front perspective view of a fiber optic connector of the fiber connector assembly of FIG. 1.

Referring now to FIGS. 1 and 2, a fiber optic connector assembly 10 that can be used in terminating at least one optical fiber in the field is shown. In the embodiment shown, the fiber optic connector assembly 10 includes two simplex assemblies 10a joined together to form a duplex assembly 10b. Each simplex assembly 10a generally includes a carrier 12 and a fiber optic connector 14 that is coupled to the carrier 12. The simplex assemblies 10a may be joined together with at least one removable joint pin 16 that is coupled to the connectors 14 of the assemblies 10a. Also, the each of the carriers 12 of the fiber optic connector assemblies 10a includes a hole 18 on a first side 20 and an integrally molded pin 22 on an opposing second side 24 so that two carriers 12 may be joined together. Since each carrier 12 includes a hole 18 and a molded pin 22 on opposite, alternating sides, a carrier 12 can be joined to another carrier at either side thereof.

The separability of the fiber optic connector assemblies 10a provides the advantage of using one or two assemblies, as needed, or being able to swap the assemblies when the position of the two fiber optic connectors 14 have to be switched relative to one another. For example, the position of the two fiber optic connectors 14 may have to be switched when the fiber optic connector assembly 10 of the present disclosure is used as an insert within a housing such as the housing of a hybrid fiber/copper connector or a quad connector as described in U.S. patent application entitled "HYBRID FIBER/COPPER CONNECTOR SYSTEM AND METHOD", filed Nov. 26, 2008, having Ser. No. 12/323,980, the entire disclosure of which is incorporated herein by reference.

As discussed in the above-mentioned application that has been incorporated herein by reference, if the gender of one of the hybrid connectors or quad connectors needs to be changed, the position of the two fiber optic connectors 14 within the housing may need to be switched. This can be accomplished by separating the two simplex fiber optic connector assemblies 10a of the present disclosure and swapping their positions.

Although described in U.S. patent application entitled "HYBRID FIBER/COPPER CONNECTOR SYSTEM AND METHOD", filed Nov. 26, 2008, having Ser. No. 12/323,980 as being usable in hybrid or quad connector housings, the fiber optic connector assembly 10 of the present disclosure can be used as an insert in any type of housing to protect the fiber optic connector assembly from damage.

While the connectors 14 shown and described as being used with the fiber optic connector assembly 10 of the present disclosure are either LX.5 or BX5 connectors as manufactured by ADC Telecommunications, Inc., which have been described in detail in U.S. Pat. Nos. 5,883,995 and 6,142,676 and U.S. patent application entitled "HYBRID FIBER/COPPER CONNECTOR SYSTEM AND METHOD", filed Nov. 26, 2008, having Ser. No. 12/323,980, hereby incorporated by reference in their entirety, it will be understood by those skilled in the art that the scope of the present disclosure is not limited to the use of a LX.5 or BX5-type connector within the assembly. Also, while the fiber optic connector assembly 10 of the present disclosure is depicted and described as being formed from two simplex connector assemblies 10a joined together to form a duplex assembly 10b, in other embodiments, the fiber optic connector assembly 10 can be configured to include any number of connectors 14 and able to terminate any number of optical fibers. Also, while the fiber optic connector assembly 10 of the present disclosure includes simplex assemblies 10a that are removably joined together, in other embodiments, the fiber optic connector assembly 10 may include any number of assemblies that are integrally formed.

For sake of simplicity, the fiber optic connector assembly 10 of the present disclosure will be described with respect to one of the simplex assemblies 10a, with the understanding that the description thereof will be applicable to the other of the simplex assemblies 10a.

Still referring to FIGS. 1 and 2, the fiber optic connector assembly 10, in addition to the carrier 12 and the fiber optic connector 14, also includes a saddle assembly 26 and an alignment guide 28 that are coupled to the carrier 12. As will be described in further detail below, the alignment guide 28 is used to align a factory terminated optical fiber 30 with a field optical fiber 32 and the saddle assembly 26 is used to mechanically splice the factory fiber 30 to the field fiber 32.

The carrier 12 includes a connector end 34 and a cable end 36, which is oppositely disposed from the connector end 34. In the present embodiment, the connector end 34 defines a slot 38 for slidably mounting the connector 14. The connector 14, further details of which are described in U.S. Pat. Nos. 5,883,995 and 6,142,676 and U.S. patent application Ser. No. 11/735,267, incorporated herein by reference in their entirety, defines a tube 40 adjacent the rear end 42 of the connector 14.

Figure 4:
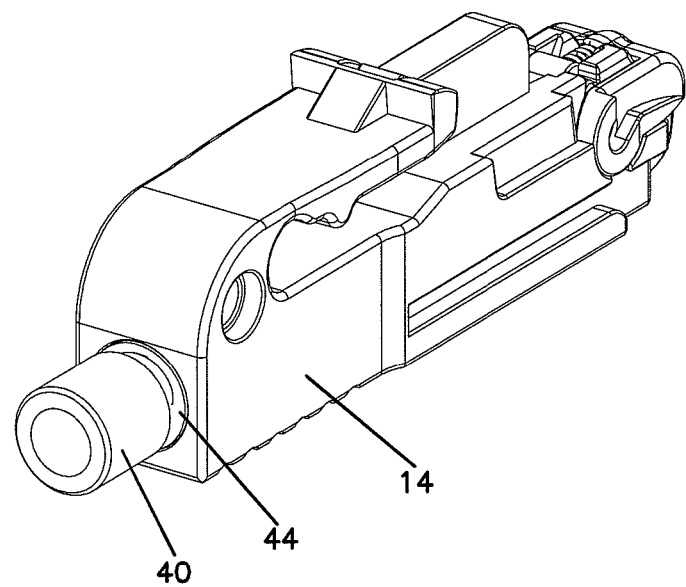
FIG. 4 is a rear perspective view of the fiber optic connector of FIG. 3.

The tube 40 defines an annular groove 44 (see FIG. 4) disposed on the outer surface of the tube 40. The connector 14 is placed on the carrier 12 with the annular groove 44 slidably fitting in the slot 38 of the carrier 12. Once slidably inserted, the connector 14 may be epoxied to the carrier 12. It will be understood by those skilled in the art that the scope of the present disclosure is not limited to the carrier defining a slot for mounting the connector and that the connector can be mounted to the carrier in any other suitable manner.

Still referring to FIGS. 1 and 2, disposed between the connector end 34 and the cable end 36 of the carrier 12 is a fiber support 48. In the embodiment shown, the fiber support 48 defines a V-shaped guide way 50 that narrow as the depth of the guide way 50 increases.

A termination region, generally designated by 52, is disposed between the cable end 36 of the carrier 12 and the fiber support 48. The termination region 52 is the portion of the carrier 12 wherein a factory terminated fiber 30 that extends from the connector 14 is mechanically spliced to a field fiber 32 that is aligned with the factory fiber 30.

The termination region 52 of the carrier 12 defines a groove 54 for supporting the alignment guide 28. The groove 54 is contoured to fit the outer surface of the alignment guide 28. The termination region 52 also defines a guide path 56 that extends from the rear end of the alignment guide 28 (when the alignment guide is in place) to the cable end 36 of the carrier 12. The guide path 56 is configured to generally align with a crimp tube hole 60 defined at the cable end 36 of the carrier 12 and also align with the guide way 50 of the fiber support 48 of the carrier 12. As will be described in further detail below, when the alignment guide 28 is positioned within the carrier 12, the guide path 56 also aligns with the throughhole 104 of the alignment guide 28 so that a factory terminated fiber 30 can be matched up to the field fiber 32.

Adjacent the cable end 36 of the carrier 12, each of the right and left sidewalls 64, 66 of the carrier 12 defines a vertical recess 68. The vertical recesses 68 are configured to accommodate the legs 70 of the saddle 72 when the saddle 72 is placed on the carrier 12, as will be discussed in further detail below. Although in the present disclosure, each carrier 12 is shown to include its own individual saddle 72, in other embodiments, a single, larger saddle may be used to expand the width of two or more simplex carriers 12.

The carrier 12 further include a crimp tube 74, which is engaged with the cable end 36 of the carrier 12. In the present embodiment, the crimp tube 74 is in a press-fit engagement with the crimp tube hole 60 in the cable end 36 of the carrier 12. In other embodiments, the crimp tube 74 may be molded integrally with the carrier 12. The crimp tube 74 defines a passageway through which the cleaved field optical fiber 32 is inserted. Strength members/layers (e.g., Kevlar) of a fiber optic cable can be crimped on the outer surface of the crimp tube 74 for securing the fiber optic cable to the carrier 12.

Figure 5:
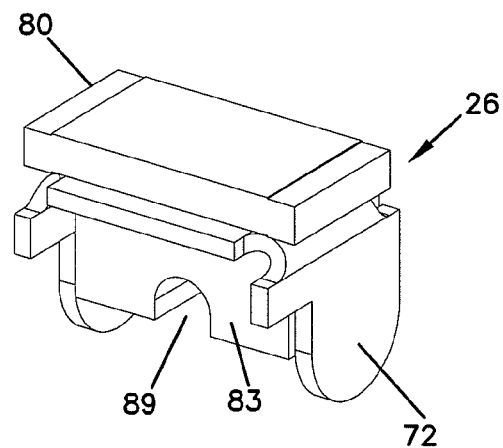
FIG. 5 is a perspective view of the saddle assembly of the fiber optic connector assembly of FIG. 1.
Figure 6:
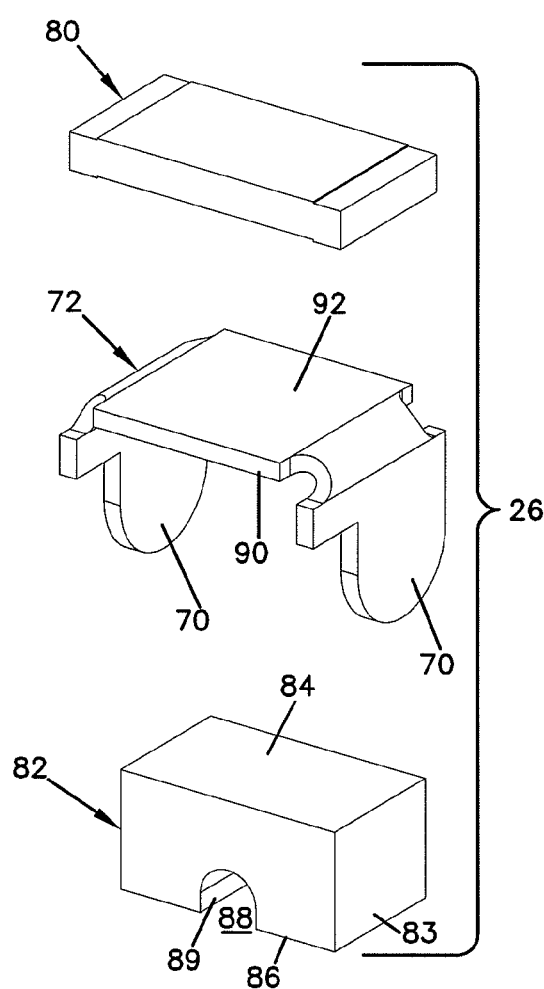
FIG. 6 is an exploded view of the saddle assembly of FIG. 5.
Figure 7:
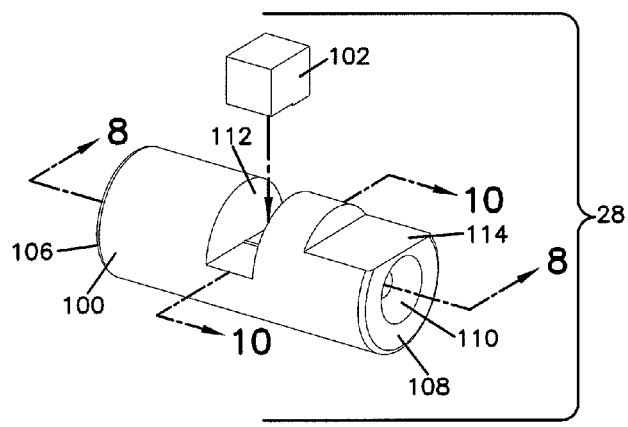
FIG. 7 is an exploded view of the alignment guide of the fiber optic connector assembly of FIG. 1.
Figure 8:
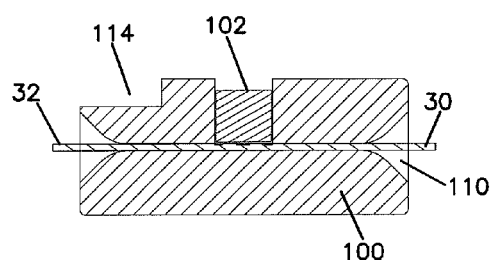
FIG. 8 is a cross-sectional view of the alignment guide taken along line 8-8 of FIG. 7 with the window of the alignment guide inserted into the base of the alignment guide.
Figure 9:
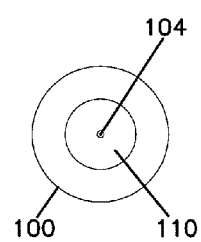
FIG. 9 is a front view of the alignment guide of FIG. 7.

Referring now to FIGS. 5 and 6, the saddle assembly 26 is shown in closer detail. The saddle assembly 26 includes the saddle 72 and a resistor 80 with a heat responsive adhesive element 82 configured to be positioned between the saddle 72 and the carrier 12. In the embodiment shown, the heat responsive element 82 is a glue pellet 83. Although in the depicted embodiment, glue pellet 83 is shown as being generally rectangular, it will be understood by those skilled in the art that other shapes for the glue pellet 83 may be used. The glue pellet 83 includes a first surface 84 and an oppositely disposed second surface 86. In the depicted embodiment, at least one pathway 88 is pre-formed in the glue pellet 83. In the depicted embodiment, the at least one pathway 88 is a channel 89 that is pre-formed in the second surface 86 of the glue pellet 83.

The channel 89 is adapted to receive a portion of the cleaved field optical fiber 32 and a portion of the field buffer, which surrounds the cleaved field optical fiber 32. In the present embodiment, the channel 89 is accurately shaped so as to conform to the outer surface of the buffer. It should be noted that the shape of the glue pellet 83 may be varied in other embodiments and may or may not include a preformed channel, depending upon the application.

As shown in FIG. 5, the glue pellet 83 is in thermally conductive contact with the saddle 72, which is in thermally conductive contact with the resistor 80. Thus, the saddle 72 is preferably made out of thermally conductive materials. In the present embodiment, the first surface 84 of the glue pellet 83 is in contact with a bottom surface 90 of the saddle 72, thereby establishing the thermally conductive contact between the glue pellet 83 and the saddle 72. The resistor 80 is in contact with a top surface 92 of the saddle 72, thereby establishing the thermally conductive contact between the resistor 80 and the saddle 72. Similar saddle assemblies including shaped adhesive pre-forms are described in U.S. patent application Ser. Nos. 11/735,267 and 11/735,260, the disclosures of which are incorporated herein by reference in their entirety.

When the field optical fiber 32 is ready for termination, a portion of the outer surface of the buffer of the field fiber optic cable is disposed in the channel 89 of the glue pellet 83. In the present embodiment, the glue pellet 83 is shaped such that nearly half of the outer circumference of the outer surface of the buffer is disposed in the channel 89.

Still referring to FIGS. 5 and 6, the saddle 72 is generally U-shaped with two legs 70 extending vertically downwardly. The glue pellet 83 is received between the legs 70. The legs 70 are configured to slide within the recesses 68 defined on the sidewalls 64, 66 of the carrier 12. As will be described in further detail below, when the glue pellet 83 melts, the saddle 72 moves vertically downwardly with respect to the carrier 12 with the legs 70 riding along the recesses 68.

Referring now to FIGS. 7-19, the alignment guide 28 in the fiber optic connector assembly 10 serves as the location for the termination of the optical fibers. The alignment guide 28 includes a base 100 and an alignment window 102 that is separately mounted on the base 100.

The base 100 is generally cylindrical in shape. In other embodiments, other shapes may be used for the base 100. The base 100 defines a throughhole 104 extending from a first end 106 to the second end 108. As shown in the Figures, at each end, the base defines a conical portion 110. The conical portions 110 taper from a larger diameter portion adjacent the ends toward a small diameter portion toward the center of the base 100. The conical portions 110 are configured to facilitate insertion of the optical fibers into the base 100.

The alignment guide 28 includes a cutout portion 112 about halfway along the length of the base 100. As will be discussed in further detail below, the cutout 112 accommodates the window 102 that is placed on the base 100. The cutout 112 is configured to expose and communicate with the throughhole 104 extending from the first end 106 to the second end 108 of the base 100.

The base 100 also includes a cutaway region 114 adjacent the second end 108. The cutaway region 114 is configured to accommodate a portion of the saddle 72 when the glue pellet 83 melts and the saddle 72 moves vertically downwardly. When the saddle 72 comes to rest, the bottom surface 90 of the saddle 72 may rest on the cutaway region 114 of the base 100.

When the base 100 is initially provided on the fiber optic connector assembly 10, a factory fiber 30 that is terminated to the connector 14 extends through the throughhole 104 in the base 100 about halfway through the length of the base 100.

The conical portion 110 at the first end 106 of the base 100 facilitates initial insertion of the factory fiber 30 into the base 100 of the alignment guide 28. The end of the factory fiber 30 is exposed to the cutout portion 112 of the base 100.

The fiber that is factory terminated to the connector 14 and extending halfway through the length of the base 100 is supported by the fiber support 48 of the carrier 12 when the connector 14 and the base 100 are placed on the carrier 12.

Figure 17:
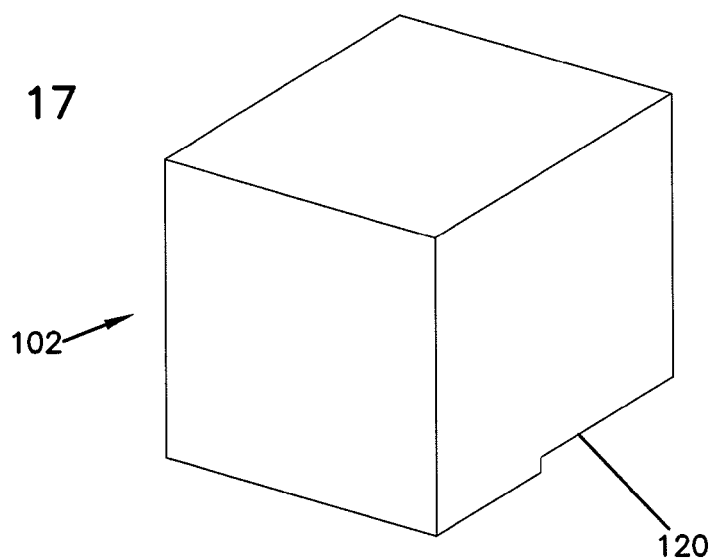
FIG. 17 is a perspective view of the alignment window of the alignment guide of FIG. 7.
Figure 18:
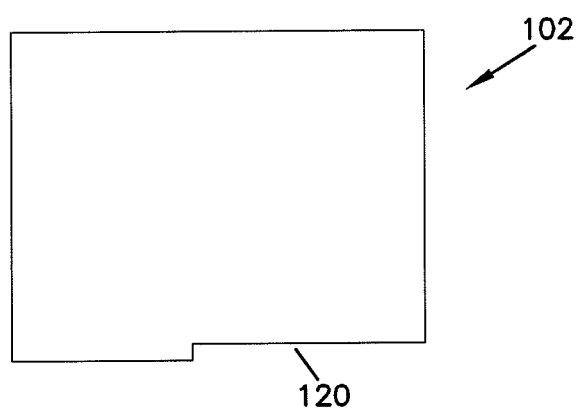
FIG. 18 is a front view of the alignment window of FIG. 17.
Figure 19:
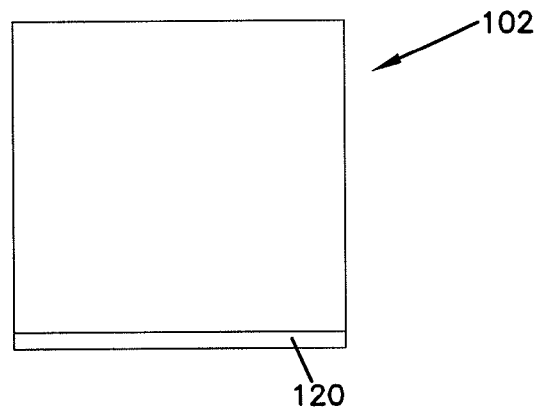
FIG. 19 is a right side view of the alignment window of FIG. 17.
Figure 20:
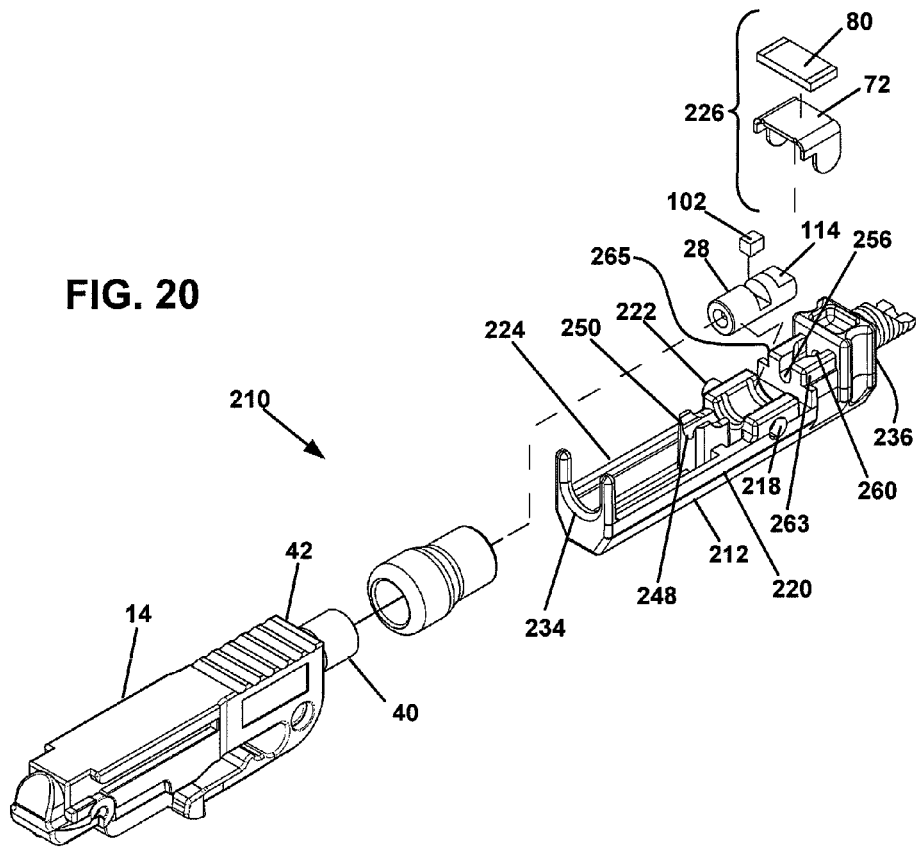
FIG. 20 is an exploded front perspective view of a second embodiment of a fiber optic connector assembly having features that are examples of inventive aspects in accordance with the principles of the present disclosure.
Figure 21:
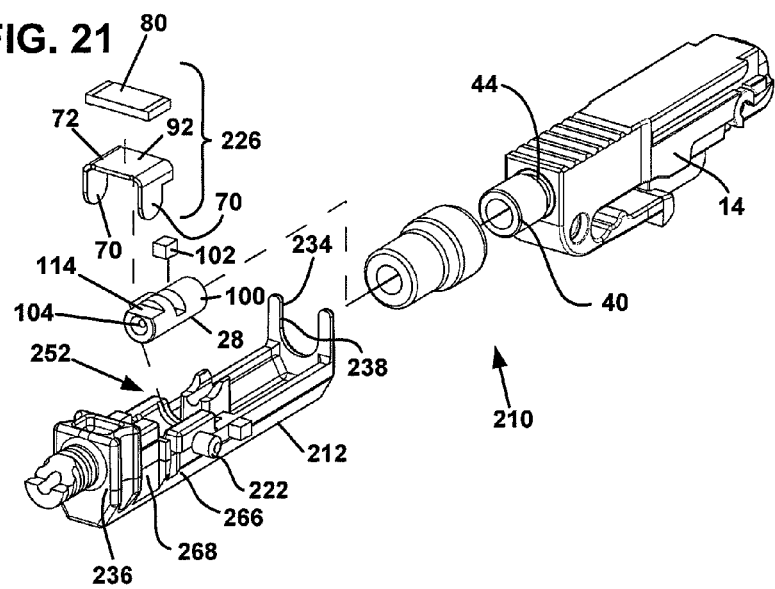
FIG. 21 is an exploded rear perspective view of the fiber optic connector assembly of FIG. 20.

Referring to FIGS. 17-19, the window 102 of the alignment guide 28 is shown in closer detail. The window 102 is placed within the cutout portion 112 of the base 100 and may be epoxied to the base 100. The window 102 is preferably made out of a transparent material such as pyrex. Other materials are possible. The window 102 is configured to allow visual confirmation of the alignment between the factory fiber 30 that extends about halfway into the base 100 (exposed to the cutout 112) and the field fiber 32 that will be inserted from the opposite end of the carrier 12 into the base 100.

Figure 10:
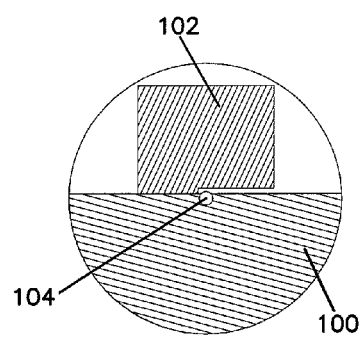
FIG. 10 is a cross-sectional view of the alignment guide taken along line 10-10 of FIG. 7 with the window of the alignment guide inserted into the base of the alignment guide.
Figure 11:
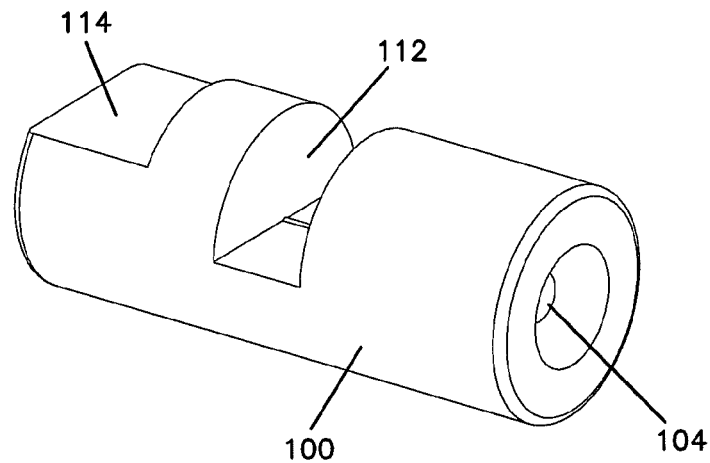
FIG. 11 is a perspective view of the base of the alignment guide of FIG. 7.
Figure 12:
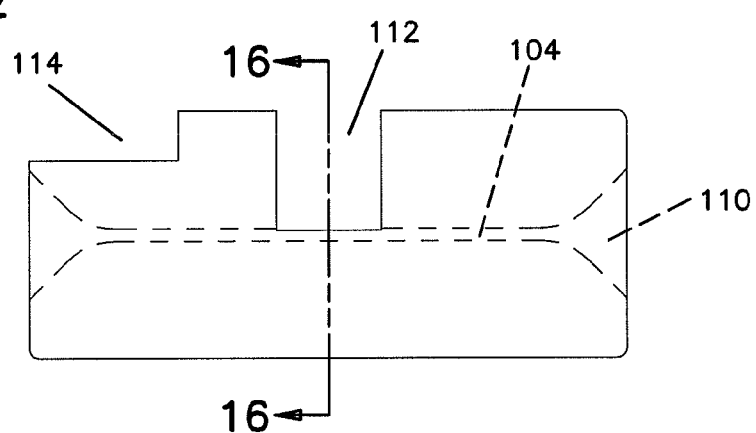
FIG. 12 is a side view of the base of FIG. 11.
Figure 13:
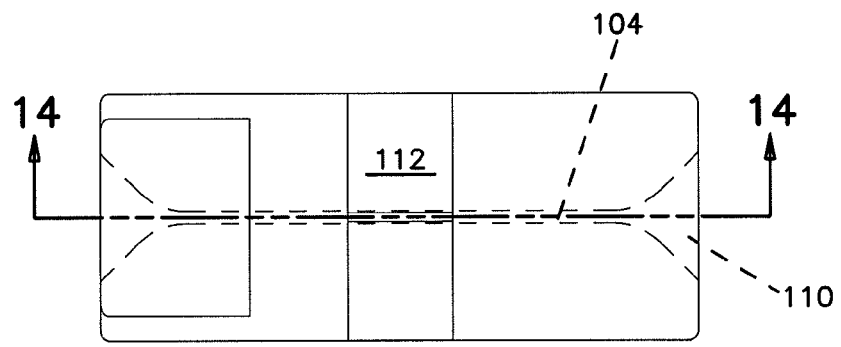
FIG. 13 is a top view of the base of FIG. 11.
Figure 14:
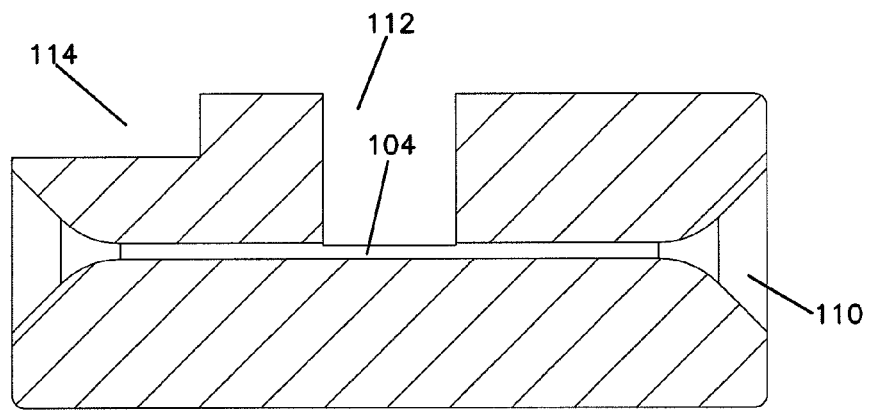
FIG. 14 is a cross-sectional view of the base taken along line 14-14 of FIG. 13.
Figure 15:
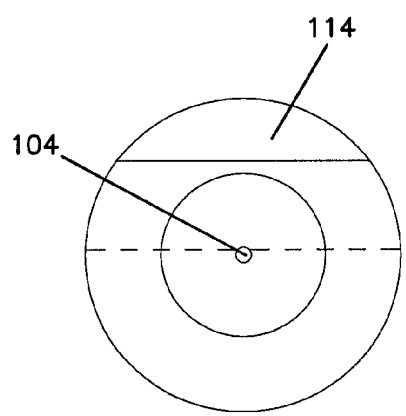
FIG. 15 is a rear view of the base of FIG. 11.
Figure 16:
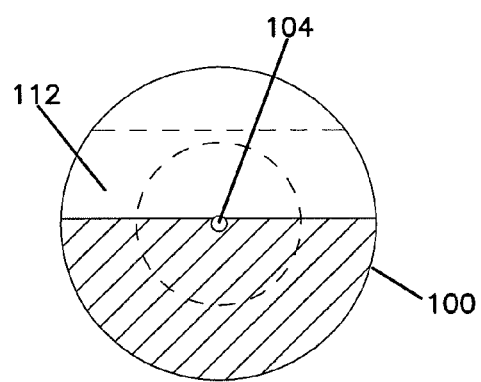
FIG. 16 is a cross-sectional view of the base taken along line 16-16 of FIG. 12.

The window 102 defines a box-like configuration with a cutout portion 120 at the bottom 122. As shown in FIG. 10, when the window 102 is placed within the cutout 112 of the base 100, the cutout portion 120 of the window 102 is exposed toward one side of the base 100 with a portion of the cutout 120 also lying over the factory fiber/field fiber alignment location. The cutout portion 120 of the window 102 is configured to allow any excess index matching gel to flow thereinto.

Once the factory fiber side of the fiber optic termination assembly is correctly positioned, the connector 14, the factory fiber stub 30 and the alignment guide 28 may be epoxied in place on the carrier 12.

In use, with the connector 14 engaged to the carrier 12, the optical fiber 30 affixed in the guide way 50 of the fiber support 48, and the factory fiber end inserted into the throughhole 104 of the base 100 of the alignment guide 28, an end of the cleaved field optical fiber 32 is inserted into the passageway of the crimp tube 74 defined at the rear of the carrier 12. The end of the cleaved field optical fiber 32 is inserted through the channel 89 of the glue pellet 83 and into the throughhole 104 of the base 100 of the alignment guide 28. In the present embodiment, an index matching gel is disposed between the cleaved end of the cleaved field optical fiber 32 and the end of the factory optical fiber 30. The index matching gel has an index of refraction that matches the index of refraction of the glass of the factory optical fiber 30 and the cleaved field optical fiber 32. According to one embodiment, the index matching gel may be hydroscopic. When the fiber ends are pushed together, the index matching gel flows into the cutout portion 120 of the window 102 filling at least a portion of the cutout 120.

With the cleaved end of the cleaved field optical fiber 32 inserted into the alignment guide 28, optical radiation is passed through the optical fibers to assess proper alignment of the fiber end of the factory fiber 30 and the cleaved end of the field fiber 32. As viewed from the window 102, if optical radiation is detectable at the junction, then the alignment/ abutment is not correct. The cleaved end may have to be polished or cleaned and reinserted into the alignment guide 28. If little to no radiation is detectable at the junction of the factory fiber end and the cleaved field fiber end, then the cleaved field optical fiber 32 and the buffer can be secured to the fiber optic connector assembly 10 using the saddle assembly 26.

To secure the cleaved optical fiber 32 and the buffer to the fiber optic connector assembly 10, an electrical power source is connected to the resistor 80. Electrical current is passed through the resistor 80 which heats up the glue pellet 83 by way of the thermally conducting saddle 72. As the glue pellet 83 heats up, the glue pellet 83 becomes tacky and adheres to the buffer and the cleaved optical fiber 32 and closes the passageway of the crimp tube 74. When the current is interrupted, the glue pellet 83 resets to secure the buffer and the cleaved optical fiber 32 in its correct position in alignment with the factory optical fiber 30.

When the glue pellet 83 first starts to melt, the legs 70 of the saddle 72 slide vertically downwardly along the recesses 68 defined on the sidewalls 64, 66 of the carrier 12. As discussed previously, the cutaway region 114 of the base 100 is configured to accommodate at least a portion of the saddle 72 as the saddle 72 moves downwardly relative to the carrier 12. When the glue pellet 83 resets, the buffer of the field fiber 32 is sealed to the guide path 56 of the carrier termination region 52, the rear end of the base 100 of the alignment guide 28 is sealed to the groove 54 in the carrier 12, and the field fiber 32 is sealed to the base 100 of the alignment guide 28, securing the entire rear side of the fiber optic termination assembly 10 in correct alignment.

A field termination kit as described in further detail in U.S. patent application entitled "FIELD TERMINATION KIT", filed Apr. 11, 2008, having Ser. No. 12/101,366, the entire disclosure of which is incorporated herein by reference, can be used in terminating the field fiber to the factory fiber as discussed herein.

In one embodiment, the glue pellet 83 may be remeltable such that if the performed seal is not satisfactory, the glue pellet 83 can be remelted by the application of electric current and reset.

In one embodiment, the carrier 12 may be manufactured out of a dielectric or polymeric material such that substantially all of the heat energy from the resistor 80 is transferred to the conductive saddle 72 rather than the carrier itself. In other embodiments, the carrier 12 may be made out of metallic materials.

In other embodiments of the carrier 12 and the saddle 72 of the fiber optic connector assembly, the legs 70 of the saddle 72 may include inwardly extending tab portions at the ends of the legs 70 for securing the saddle 72 to the carrier 12 and to limit separation during upward movement of the saddle 72 relative to the carrier 12. In such an embodiment, the saddle 72 would snap fit onto the carrier 12 with the legs 70 extending along the recesses 68 and the inwardly extending tab portions extending into inwardly extending slots formed at the ends of the recesses 68. In this manner, the saddle 72 may remain attached to the carrier 12 even if the saddle 72 moves upwardly relative to the carrier 12, with the tabs of the legs 70 catching the inwardly extending slots at the bottom ends of the recesses 68 of the carrier 12.

As discussed above, with the field optical fiber 32 secured, the fiber optic connector assembly 10 can also be provided as an insert for a housing to protect the fiber optic connector assembly 10 from damage. A number of housings into which the fiber optic connector assembly 10 can be inserted are described in U.S. patent application entitled "HYBRID FIBER/COPPER CONNECTOR SYSTEM AND METHOD", filed Nov. 26, 2008, having Ser. No. 12/323,980, hereby incorporated by reference in its entirety.

Referring now to FIGS. 20-24, a second embodiment of a fiber optic connector assembly 210 that can be used in terminating at least one optical fiber in the field is shown. The fiber optic connector assembly 210 is similar in construction and use to the fiber optic connector assembly 10 shown in FIGS. 1-19 of the present disclosure, except for a number of differences that will be highlighted in further detail below.

For sake of simplicity, the fiber optic connector assembly 210 will be described with respect to a simplex assembly. This is with the understanding that, as in the first embodiment of the fiber optic connector assembly 10 shown in FIGS. 1-19, the simplex fiber optic connector assembly 210 may be joined to other like simplex assemblies to form a duplex or other assembly. This is also with the understanding that the description thereof will be applicable to the other like simplex assemblies.

As discussed with respect to the first embodiment of the fiber optic connector assembly 10 of FIGS. 1-19, the simplex assembly 210 may be joined to another simplex assembly with at least one removable joint pin 16 that is coupled to the connectors 14 of the assemblies 210. Also, each carrier 212 includes a hole 218 on a first side 220 and an integrally molded pin 222 on an opposing second side 224 so that two carriers 212 may be joined together. Since each carrier 212 includes a hole 218 and a molded pin 222 on opposite, alternating sides, a carrier 212 can be joined to another carrier at either side thereof.

As discussed previously, the separability of the fiber optic connector assemblies 210 provides the advantage of using one or two simplex assemblies, as needed, or being able to swap the assemblies when the position of the two fiber optic connectors 14 have to be switched relative to one another. For example, the position of the two fiber optic connectors 14 may have to be switched when the fiber optic connector assembly 210 of the present disclosure is used as an insert within a housing such as the housing of a hybrid fiber/copper connector or a quad connector as described in U.S. patent application entitled "HYBRID FIBER/COPPER CONNECTOR SYSTEM AND METHOD", filed Nov. 26, 2008, having Ser. No. 12/323,980, the entire disclosure of which has been incorporated herein by reference.

As discussed in the above-mentioned applications that have been incorporated herein by reference, if the gender of one of the hybrid connectors or quad connectors needs to be changed, the position of the two fiber optic connectors 14 within the housing may need to be switched. This can be accomplished by separating the two simplex fiber optic connector assemblies 210 of the present disclosure and swapping their positions.

As discussed previously, the simplex fiber optic connector assembly 210 may be configured to be joined to any number of like assemblies, either removably or integrally, and terminate any number of fibers. Duplex assemblies are one example.

As in the embodiment discussed previously, although described in U.S. patent application entitled "HYBRID FIBER/COPPER CONNECTOR SYSTEM AND METHOD", filed Nov. 26, 2008, having Ser. No. 12/323,980 as being usable in hybrid or quad connector housings, the fiber optic connector assembly 210 can be used as an insert in any type of housing to protect the fiber optic connector assembly 210 from damage.

It should also be noted that, as in the previous embodiment discussed, the fiber optic connector assembly 210 is not limited to use with a LX.5 or BX5-type fiber optic connector within the assembly and may be utilized with other types of fiber optic connectors.

Now referring to FIGS. 20-24, the fiber optic connector assembly 210 is similar to the fiber optic connector assembly 10 shown in FIGS. 1-19 except that, instead of utilizing a heat responsive adhesive element for bonding the field optical fiber and the buffer to the carrier, the fiber optic connector assembly 210 includes a carrier 212 that is made out of polymeric (e.g., a thermoplastic) material, wherein portions of the thermoplastic carrier 212 are configured to melt and assume a flowable condition and contact the field optic fiber and buffer and provide the bonding. As in the fiber optic connector assembly 10 of FIGS. 1-19, the fiber optic connector assembly 210 includes the fiber optic connector 14, the alignment guide 28, and a saddle assembly 226. However, the saddle assembly 226 does not include the heat responsive adhesive element. As discussed, portions of the carrier 212 are configured to be melted to provide the bonding instead of utilizing a separate heat responsive adhesive element.

The carrier 212 of the fiber optic connector assembly 210 is shown in detail in FIGS. 40-43. Referring to FIGS. 20-24 and FIGS. 40-43, similar to the carrier 12 of the fiber optic connector assembly 10 of FIGS. 1-19, the carrier 212 includes a connector end 234 and a cable end 236, which is oppositely disposed from the connector end 234. In the present embodiment, the connector end 234 defines a slot 238 for slidably mounting a fiber optic connector 14. As in the previous embodiment, the connector 14 may be a connector whose further details are described in U.S. Pat. Nos. 5,883,995 and 6,142,676 and U.S. patent application Ser. No. 11/735,267, incorporated herein by reference in their entirety. The connector 14 defines a tube 40 adjacent the rear end 42 of the connector 14. The tube 40 defines an annular groove 44 disposed on the outer surface of the tube 40. The connector 14 is placed on the carrier 212 with the annular groove 44 slidably fitting in the slot 238 of the carrier 212. Once slidably inserted, the connector 14 may be epoxied to the carrier 212. It will be understood by those skilled in the art that the scope of the present disclosure is not limited to the carrier defining a slot for mounting the connector and that the connector can be mounted to the carrier in any other suitable manner.

Still referring to FIGS. 20-24 and 40-43, disposed between the connector end 234 and the cable end 236 of the carrier 212 is a fiber support 248. In the embodiment shown, the fiber support 248 defines a U-shaped guide way 250.

Similar to the carrier 12 of the fiber optic connector assembly 10 of FIGS. 1-19, a termination region 252 is disposed between the cable end 236 of the carrier 212 and the fiber support 248. A factory terminated fiber that extends from the connector 14 is mechanically spliced to a field fiber that is aligned with the factory fiber in the termination region 252.

The termination region 252 of the carrier 212 defines a groove 254 for supporting the alignment guide 28. The groove 254 is contoured to fit the outer surface of the alignment guide 28. The termination region 252 also defines a guide path 256 that extends from the rear end of the alignment guide 28 (when the alignment guide is in place) to the cable end 236 of the carrier 212. The guide path 256 is configured to generally align with a crimp tube hole 260 defined at the cable end 236 of the carrier 212 and also align with the guide way 250 of the fiber support 248 of the carrier 212. When the alignment guide 28 is positioned within the carrier 212, the guide path 256 also aligns with the throughhole 104 of the alignment guide 28 so that a factory terminated fiber can be matched up to the field fiber.

The carrier 212 defines right and left vertical walls 263, 265, respectively, extending upwardly adjacent the cable end 236 of the carrier 212. The right and left vertical walls 263, 265 surround the guide path 256 that extends from the rear end 108 of the alignment guide 28 (when the alignment guide is in place) to the cable end 236 of the carrier 212. As will be discussed in further detail below, the right and left vertical walls 263, 265 are configured to support the saddle assembly 226 and when thermal energy is applied to the saddle assembly 226, the right and the left vertical walls 263, 265 are configured to melt to bond the field fiber and buffer to the carrier 212.

The carrier 212 further includes a crimp tube 274 integrally molded with the thermoplastic carrier 212. The crimp tube 274 defines a passageway through which the cleaved field optical fiber is inserted. Strength members/layers (e.g., Kevlar) of a fiber optic cable can be crimped on the outer surface of the crimp tube 274 for securing the fiber optic cable to the carrier 212.

Referring now to FIGS. 20-24, when the saddle 72 is placed on the carrier 212, the bottom surface 90 of the saddle 72 makes contact with the top surfaces 267 of the right and left vertical walls 263, 265. The right and left vertical walls 263, 265 are received between the downwardly extending legs 70 of the saddle 72. As in the previous embodiment, the saddle 72 is in thermally conductive contact with a resistor 80 which sits on a top surface 92 of the saddle 72, when the saddle assembly 226 is assembled.

When thermal energy is applied to the saddle 72 through the resistor 80, the right and left vertical walls 263, 265 that are in contact with the saddle 72 start to melt. The saddle 72 moves vertically downwardly with respect to the carrier 212 with the legs 70 of the saddle 72 riding along the recesses 268 defined at the sidewalls 264, 266 of the carrier 212. The legs 70 of the saddle 72 assist in directing the melting, flowable material toward the center of the carrier 212 into the guide path 256.

Although in the present disclosure, each carrier 212 is shown to include its own individual saddle 72, in other embodiments, a single, larger saddle may be used to expand the width of two or more simplex carriers 212.

As discussed above, the use of the fiber optic connector assembly 210 of FIGS. 20-24 is similar to that of the fiber optic connector assembly 10 of FIGS. 1-19. In use, with the connector 14 engaged to the carrier 212, the optical fiber affixed in the guide way 250 of the fiber support 248, and the factory fiber end inserted into the throughhole 104 of the base 100 of the alignment guide 28, an end of the cleaved field optical fiber is inserted into the passageway of the crimp tube 274 defined at the rear of the carrier 212. The end of the cleaved field optical fiber is inserted between the right and left vertical walls 263, 265 of the carrier 212 and into the throughhole 104 of the base 100 of the alignment guide 28. An index matching gel is disposed between the cleaved end of the cleaved field optical fiber and the end of the factory optical fiber.

With the cleaved end of the cleaved field optical fiber inserted into the alignment guide 28, optical radiation is passed through the optical fibers to assess proper alignment of the fiber end of the factory fiber and the cleaved end of the field fiber through the window 102. Once alignment is established, to secure the cleaved optical fiber and the buffer to the fiber optic connector assembly 210, an electrical power source is connected to the resistor 80. Electrical current is passed through the resistor 80 which transfers the heat energy to the thermally conductive saddle 72. As the thermally conductive saddle 72 transfers the heat energy to the right and left vertical walls 263, 265 of the carrier 212, the vertical walls 263, 265 begin to melt and assume a flowable condition. The melting material adheres to the buffer and the cleaved optical fiber and closes the passageway of the crimp tube 274. When the current is interrupted, the melted material solidifies to secure the buffer and the cleaved optical fiber in its correct position in alignment with the factory optical fiber.

As discussed above, when the vertical walls 263, 265 first start to melt and flow, the legs 70 of the saddle 72 slide vertically downwardly along the recesses 268 defined at the sidewalls 264, 266 of the carrier 212. The legs 70 of the saddle 72 contain the melting material and direct it toward the guide path 256 of the carrier 212.

Figure 22:
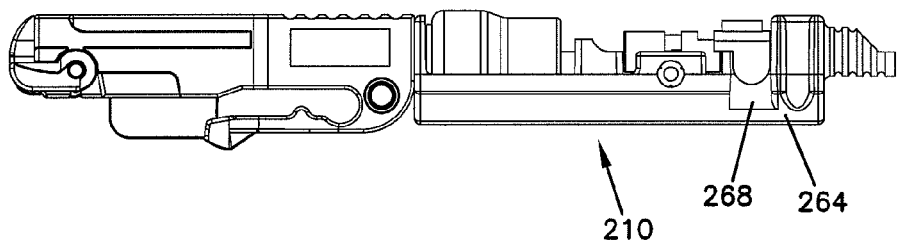
FIG. 22 is a right side view of the fiber optic connector assembly of FIG. 20, the fiber optic connector assembly shown in a fully assembled configuration.
Figure 23:
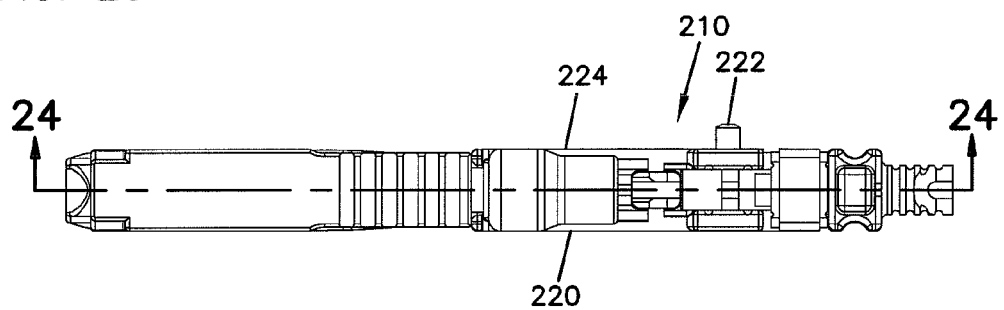
FIG. 23 is a top view of the fiber optic connector assembly of FIG. 22.
Figure 24:
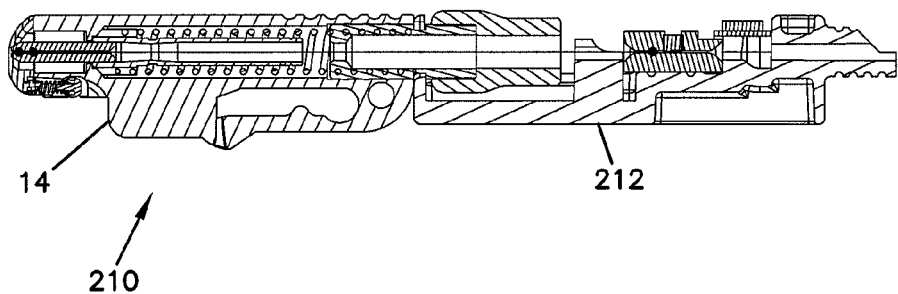
FIG. 24 is a cross-sectional view of the fiber optic connector assembly taken along line 24-24 of FIG. 23.
Figure 25:
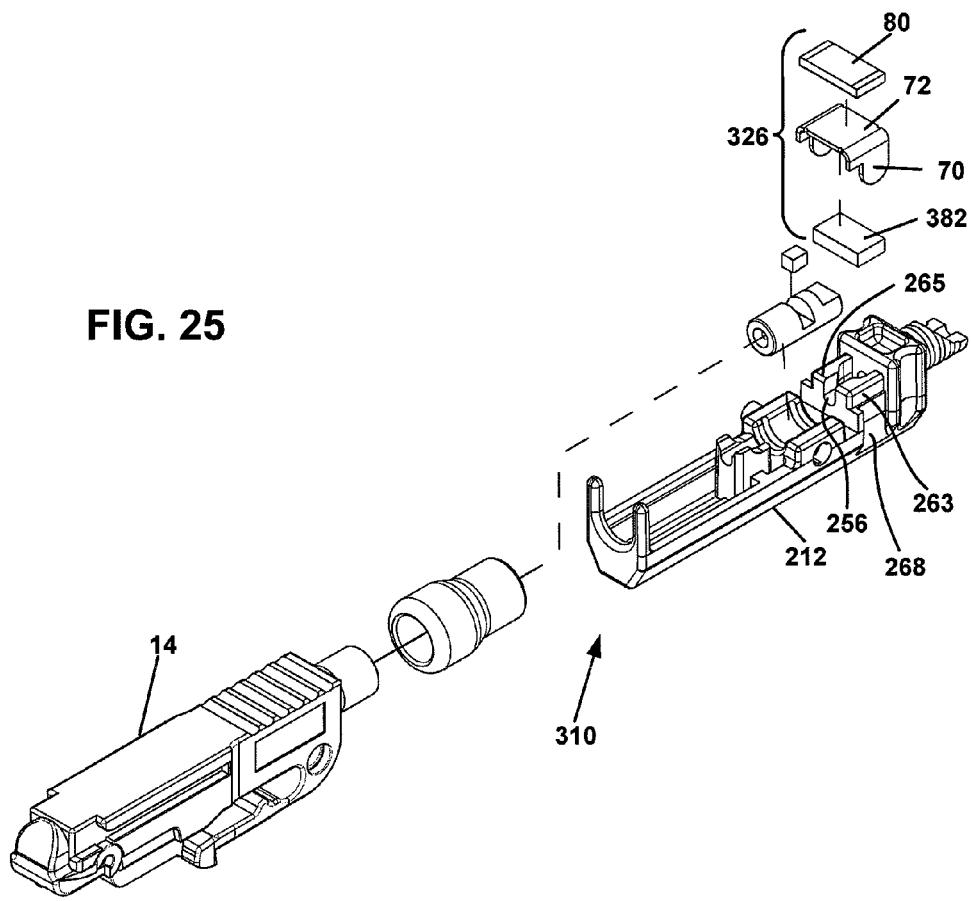
FIG. 25 is an exploded front perspective view of a third embodiment of a fiber optic connector assembly having features that are examples of inventive aspects in accordance with the principles of the present disclosure.
Figure 26:
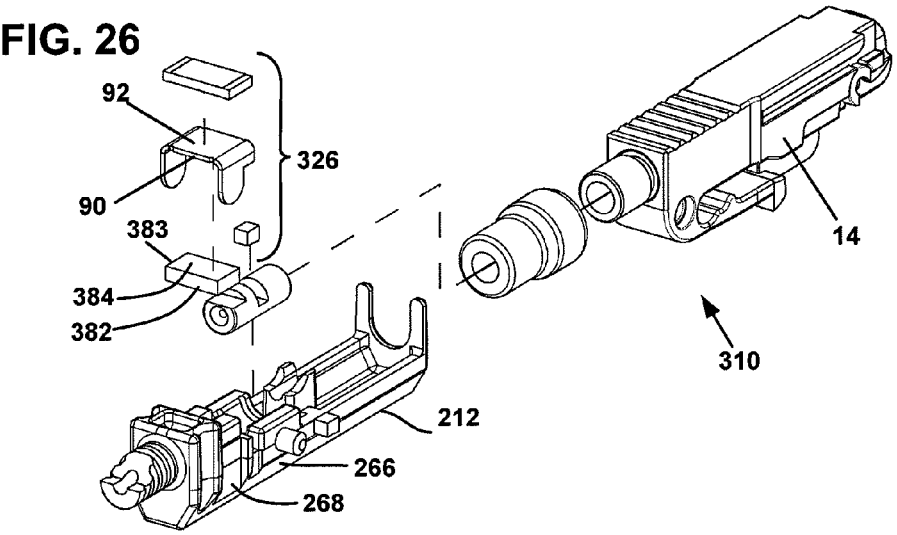
FIG. 26 is an exploded rear perspective view of the fiber optic connector assembly of FIG. 25.
Figure 27:
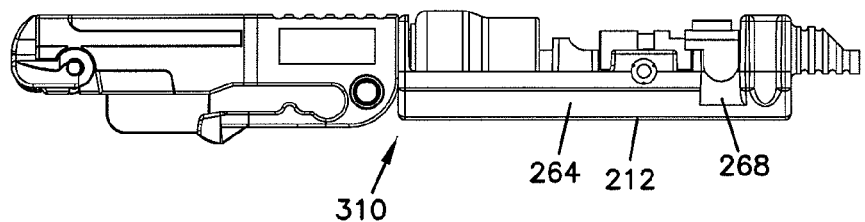
FIG. 27 is a right side view of the fiber optic connector assembly of FIG. 25, the fiber optic connector assembly shown in a fully assembled configuration.
Figure 28:
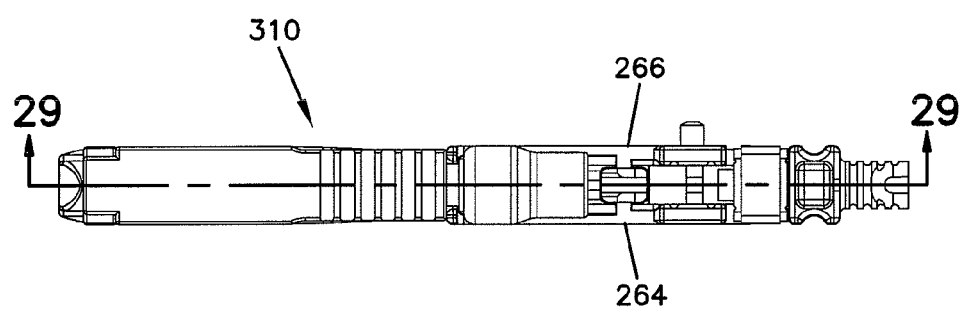
FIG. 28 is a top view of the fiber optic connector assembly of FIG. 27.
Figure 29:
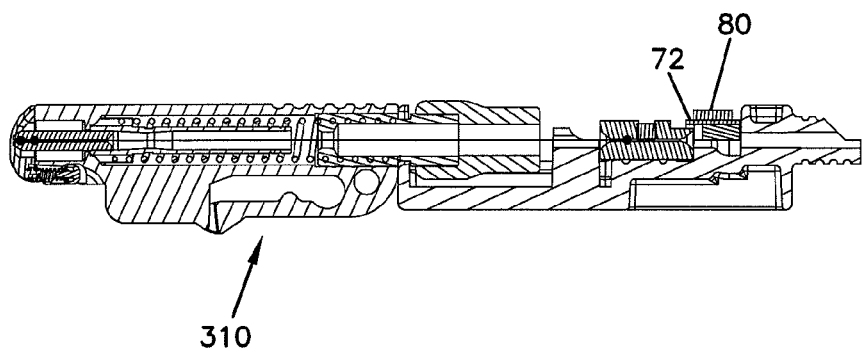
FIG. 29 is a cross-sectional view of the fiber optic connector assembly taken along line 29-29 of FIG. 28.
Figure 30:
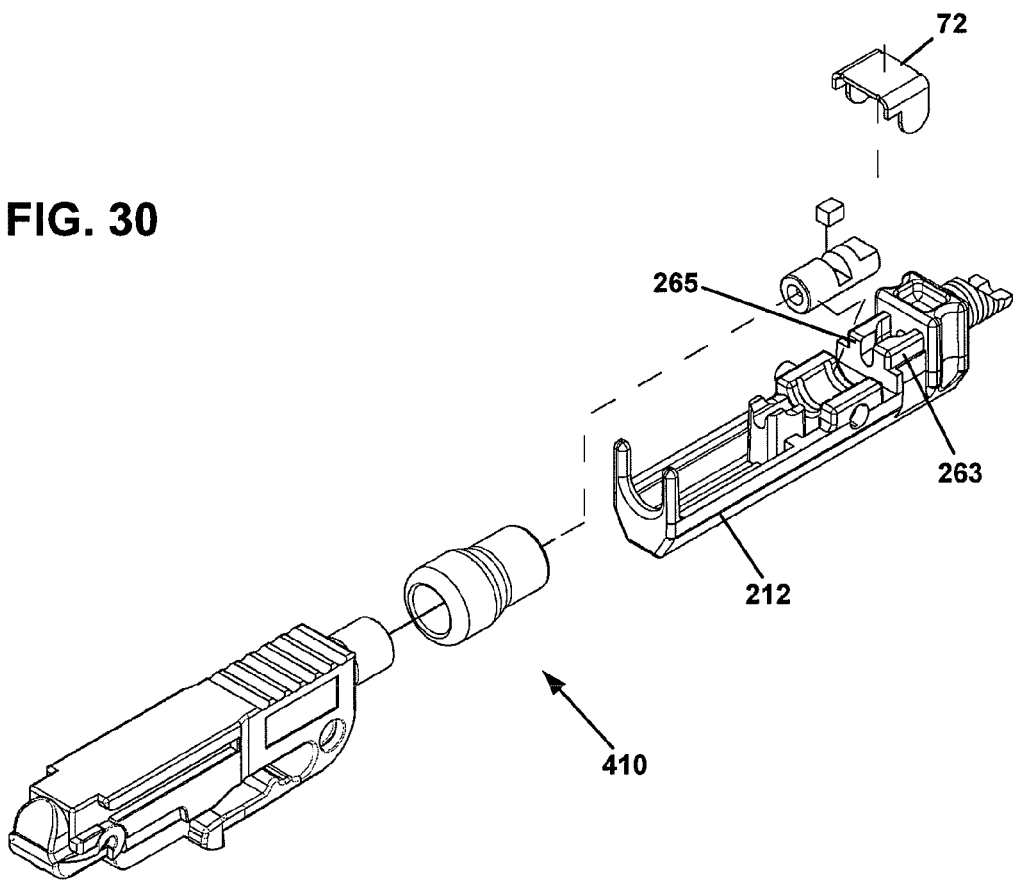
FIG. 30 is an exploded front perspective view of a fourth embodiment of a fiber optic connector assembly having features that are examples of inventive aspects in accordance with the principles of the present disclosure.
Figure 31:
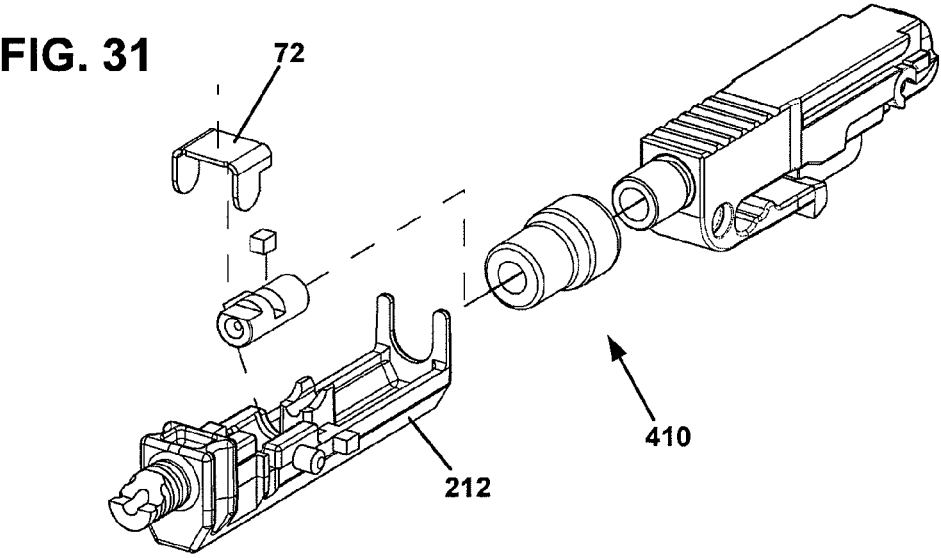
FIG. 31 is an exploded rear perspective view of the fiber optic connector assembly of FIG. 30.
Figure 32:
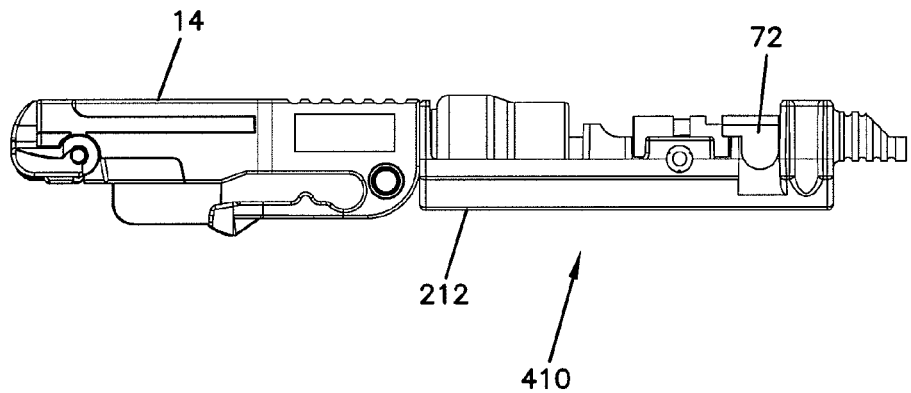
FIG. 32 is a right side view of the fiber optic connector assembly of FIG. 30, the fiber optic connector assembly shown in a fully assembled configuration.
Figure 33:
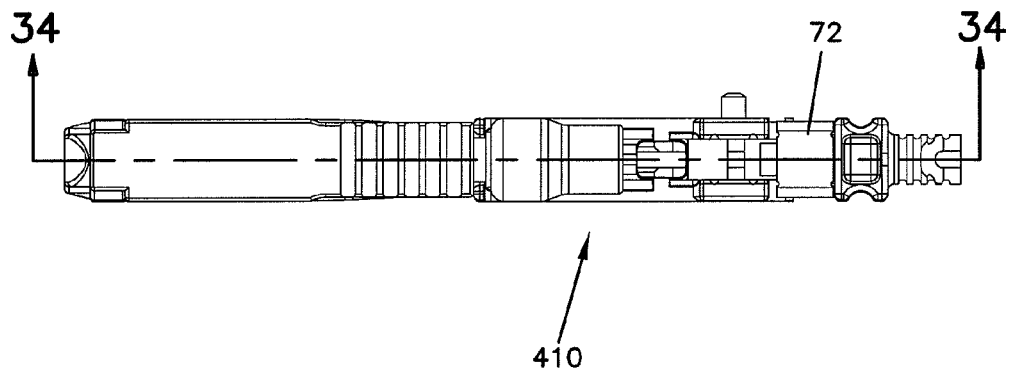
FIG. 33 is a top view of the fiber optic connector assembly of FIG. 32.
Figure 34:
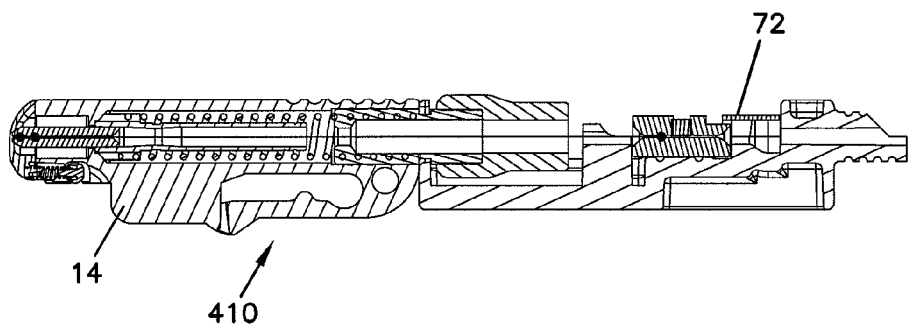
FIG. 34 is a cross-sectional view of the fiber optic connector assembly taken along line 34-34 of FIG. 33.
Figure 35:
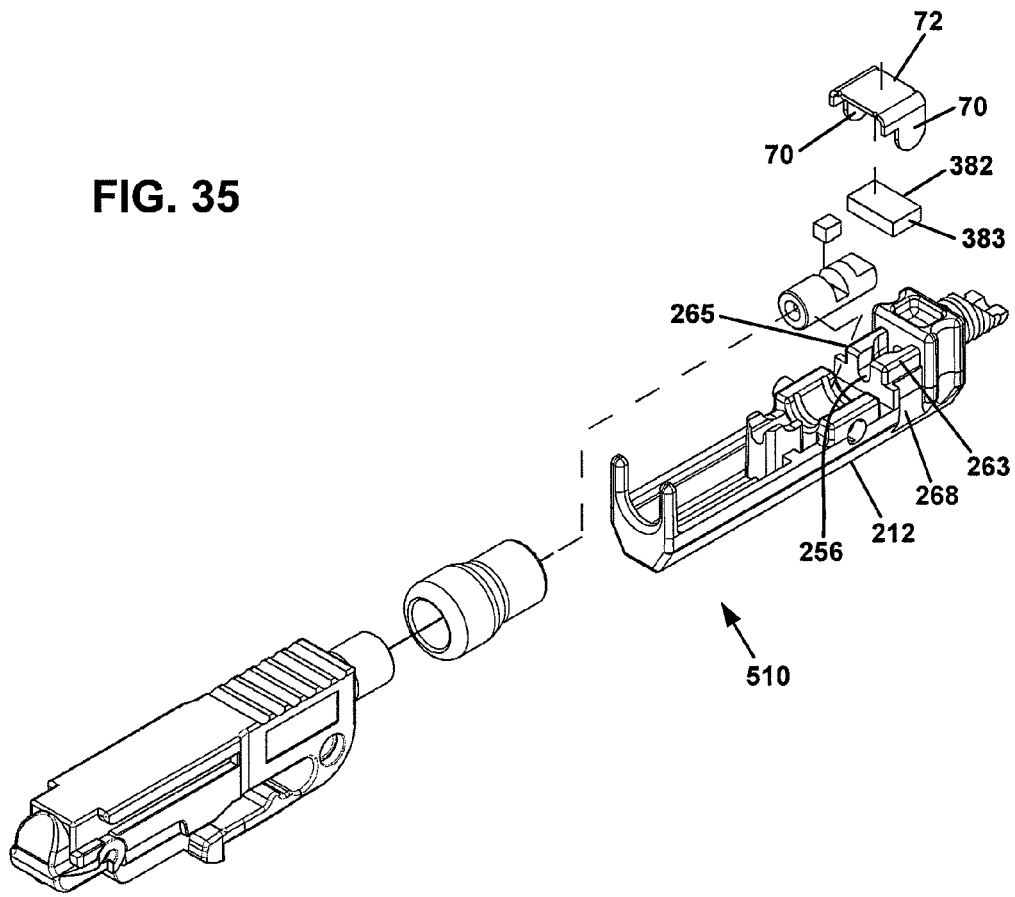
FIG. 35 is an exploded front perspective view of a fifth embodiment of a fiber optic connector assembly having features that are examples of inventive aspects in accordance with the principles of the present disclosure.
Figure 36:
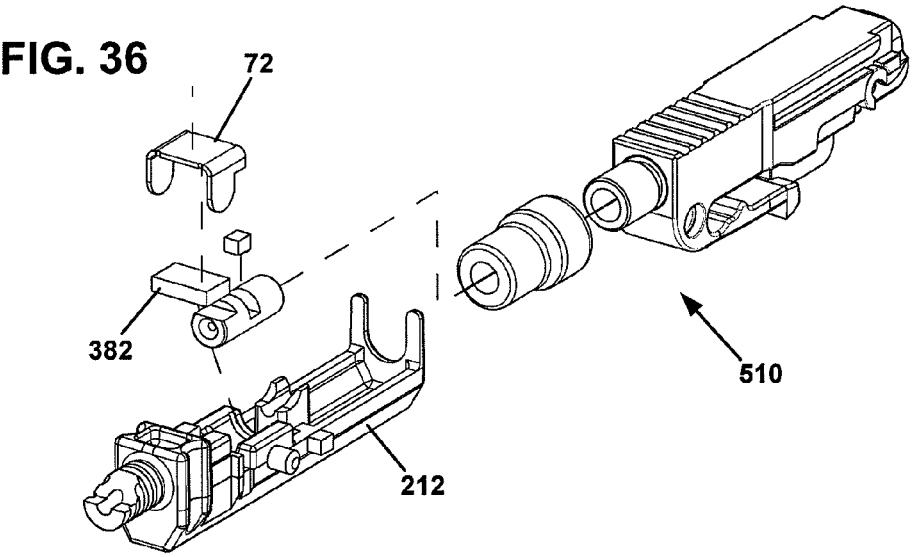
FIG. 36 is an exploded rear perspective view of the fiber optic connector assembly of FIG. 35.
Figure 37:
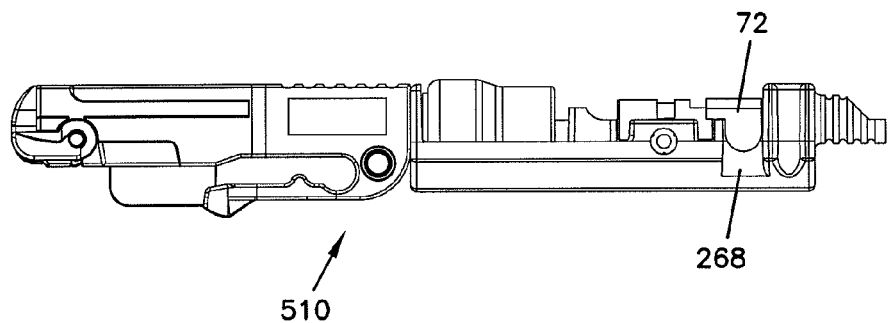
FIG. 37 is a right side view of the fiber optic connector assembly of FIG. 35, the fiber optic connector assembly shown in a fully assembled configuration.
Figure 38:
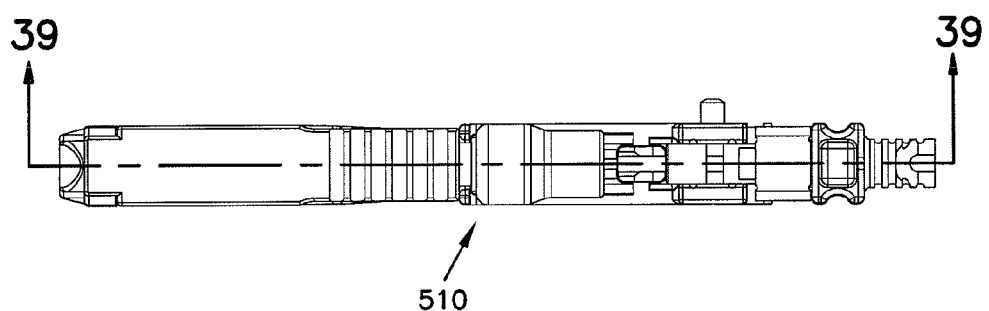
FIG. 38 is a top view of the fiber optic connector assembly of FIG. 37.
Figure 39:
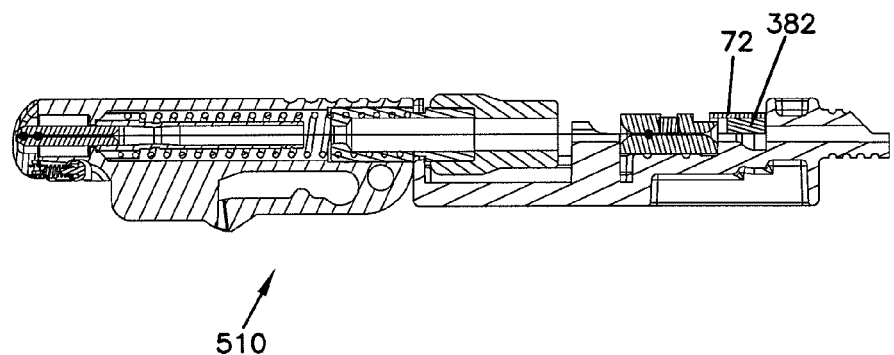
FIG. 39 is a cross-sectional view of the fiber optic connector assembly taken along line 39-39 of FIG. 38.
Figure 40:
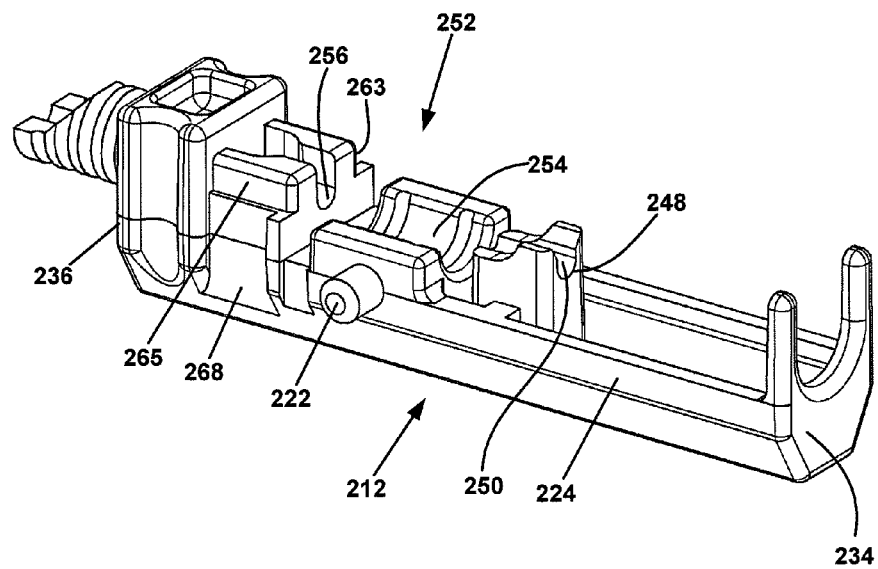
FIG. 40 is a front perspective view of a carrier that is configured for use with each of the fiber connector assemblies shown in FIGS. 20-39.
Figure 41:
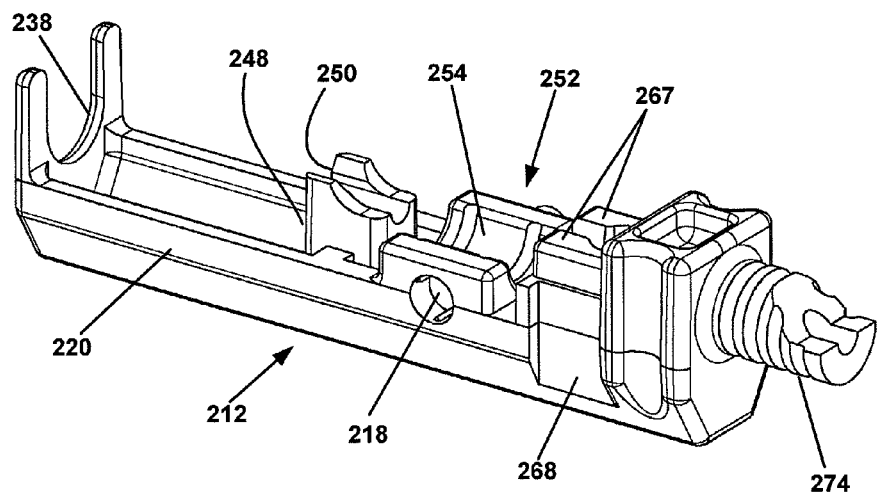
FIG. 41 is a rear perspective view of the carrier of FIG. 40.
Figure 42:
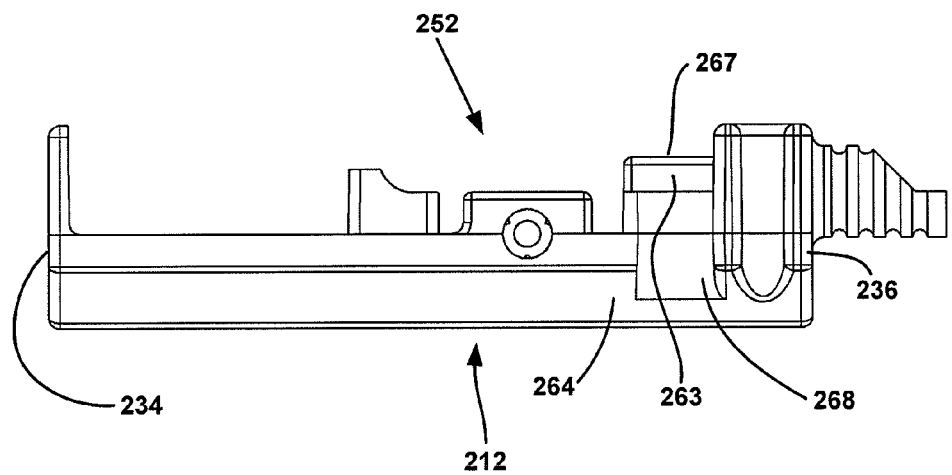
FIG. 42 is a right side view of the carrier of FIG. 40.
Figure 43:
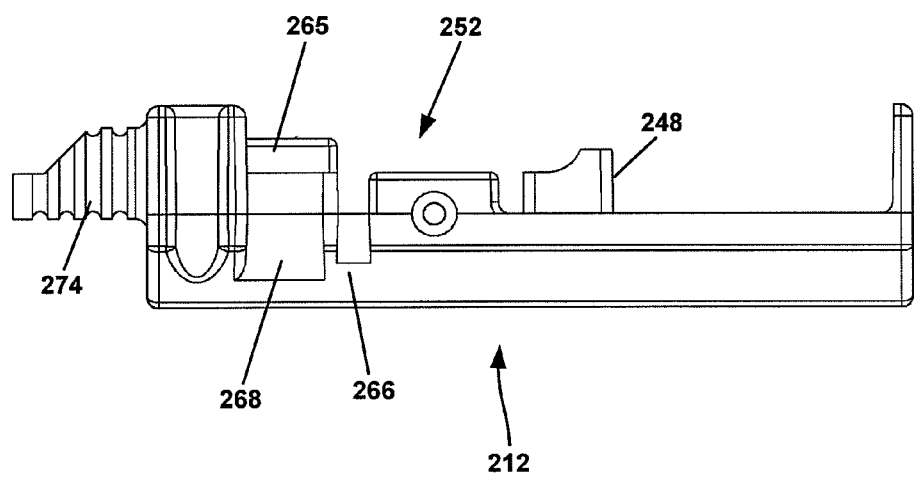
FIG. 43 is a left side view of the carrier of FIG. 40.
Figure 44:
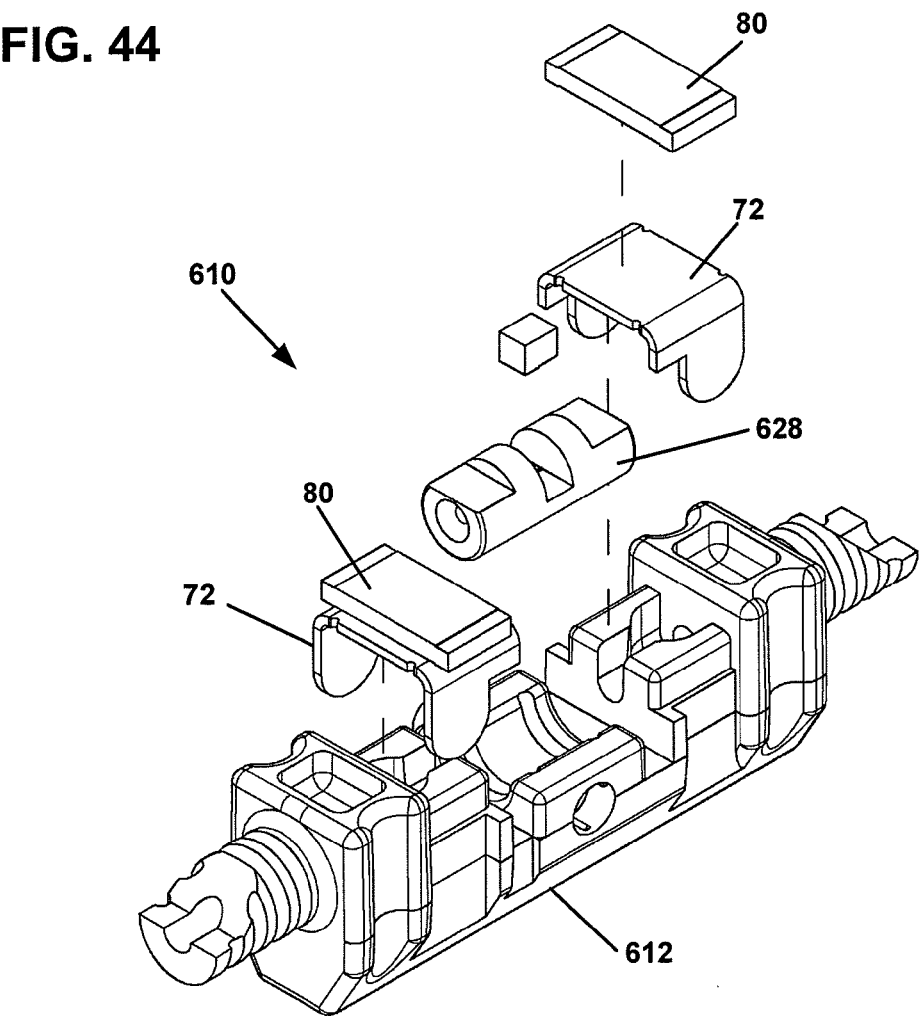
FIG. 44 is an exploded perspective view of a termination assembly having features that are examples of inventive aspects in accordance with the principles of the present disclosure.
Figure 45:
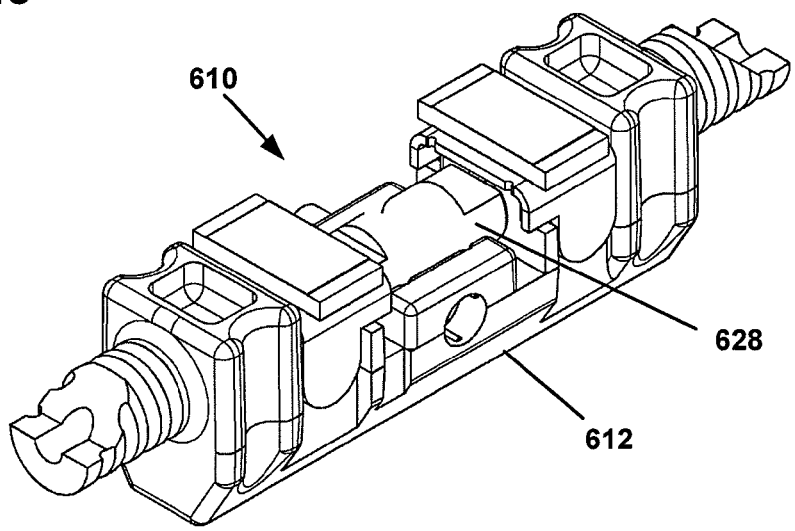
FIG. 45 illustrates the termination assembly of FIG. 44 in a fully assembled configuration.
Figure 46:
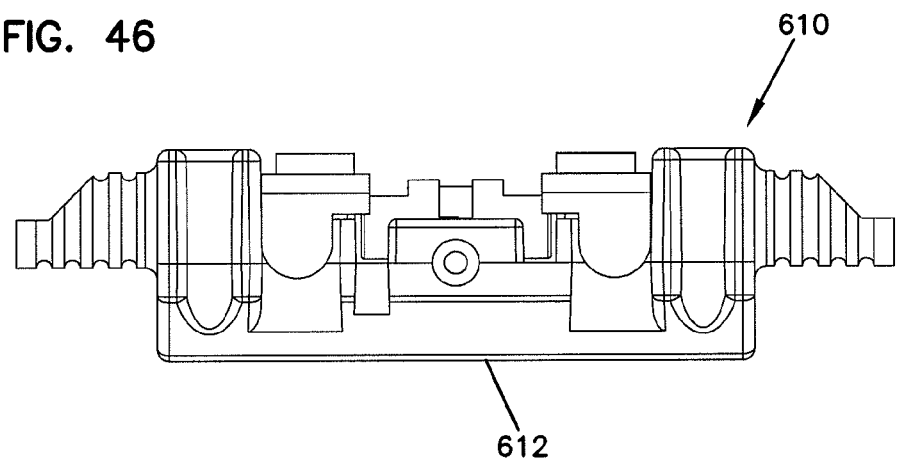
FIG. 46 is a side view of the termination assembly of FIG. 45.
Figure 47:
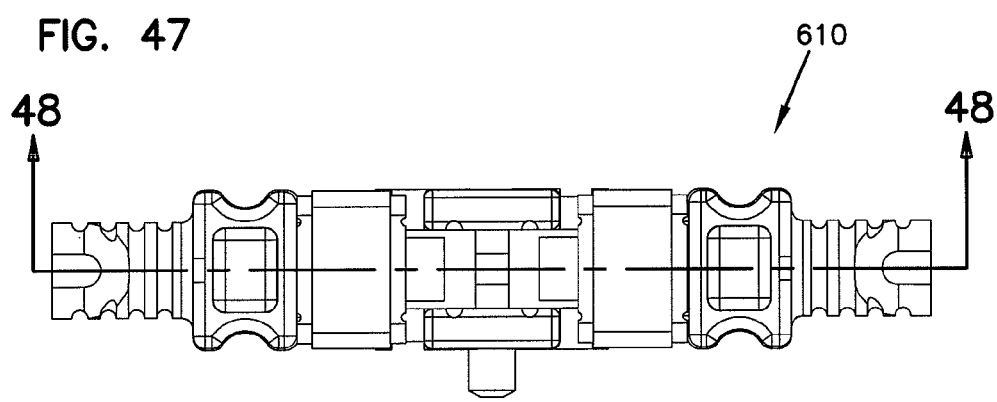
FIG. 47 is a top view of the termination assembly of FIG. 45.
Figure 48:
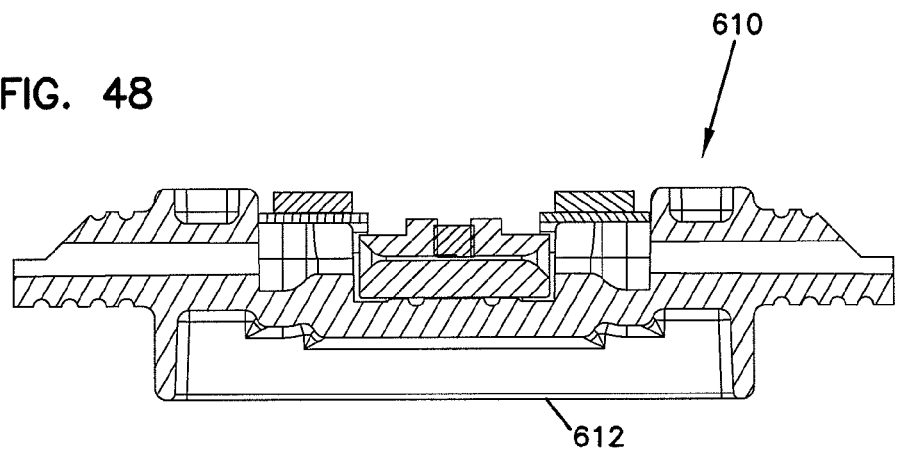
FIG. 48 is a cross-sectional view of the termination assembly taken along line 48-48 of FIG. 47.
Figure 49:
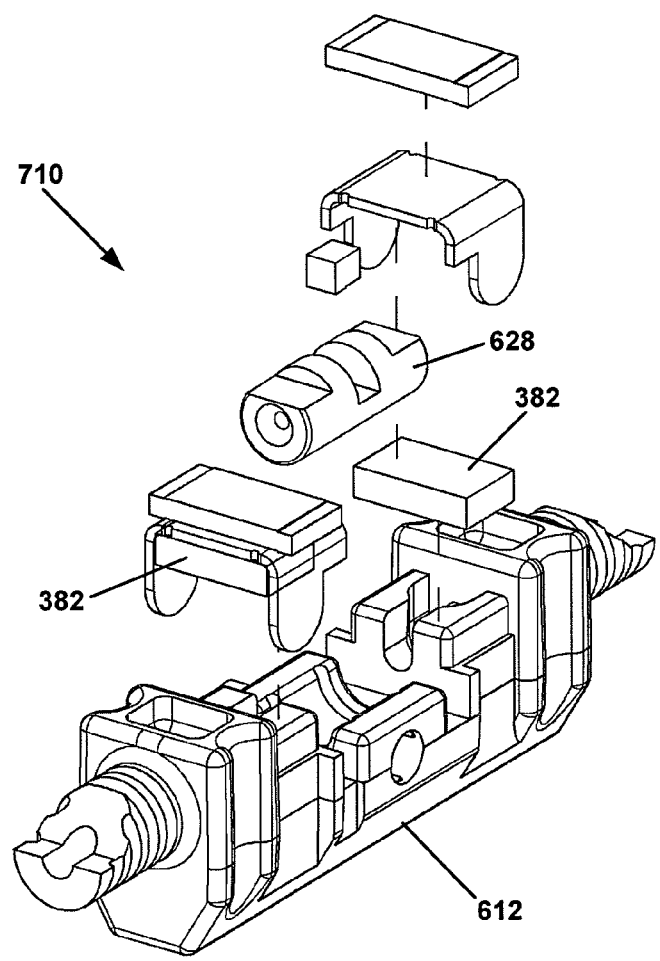
FIG. 49 is an exploded perspective view of another embodiment of a termination assembly having features that are examples of inventive aspects in accordance with the principles of the present disclosure.
Figure 50:
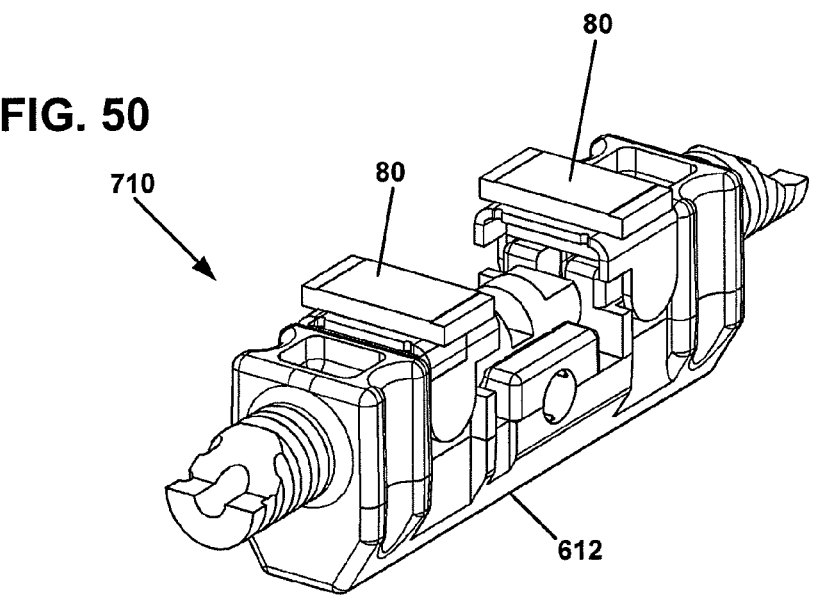
FIG. 50 illustrates the termination assembly of FIG. 49 in a fully assembled configuration.
Figure 51:
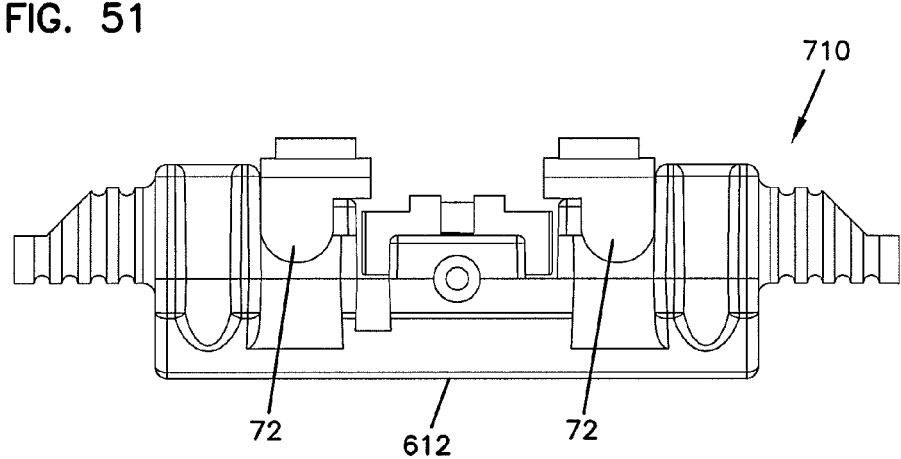
FIG. 51 is a side view of the termination assembly of FIG. 50.
Figure 52:
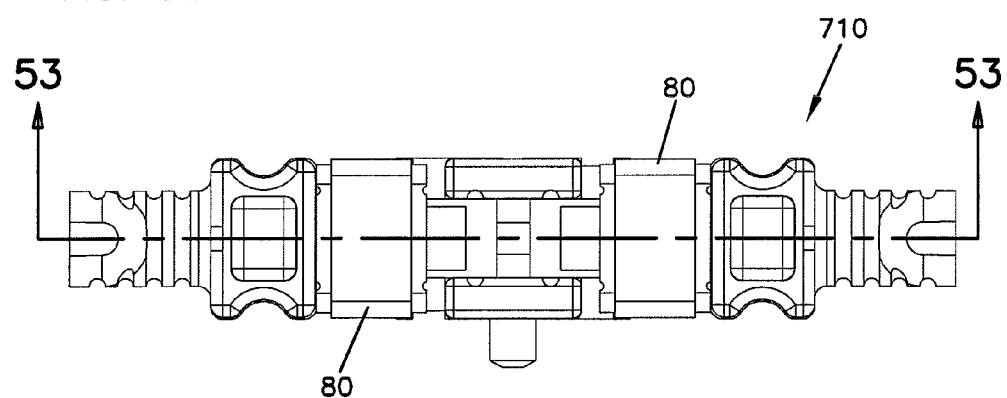
FIG. 52 is a top view of the termination assembly of FIG. 50.
Figure 53:
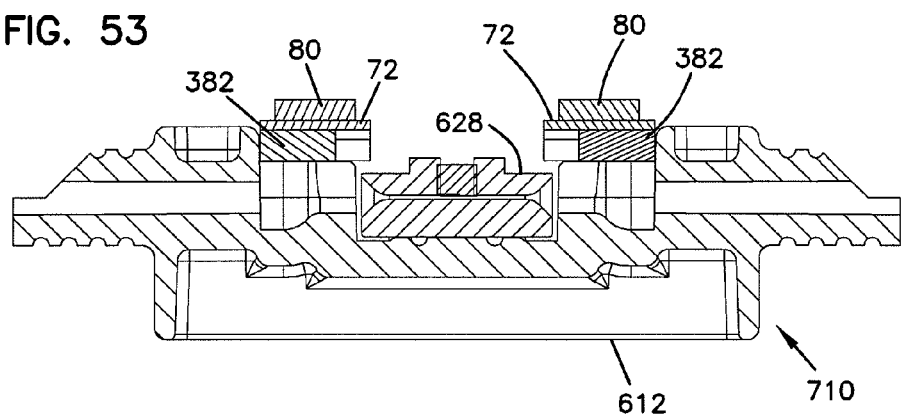
FIG. 53 is a cross-sectional view of the termination assembly taken along line 53-53 of FIG. 52.
Figure 54:
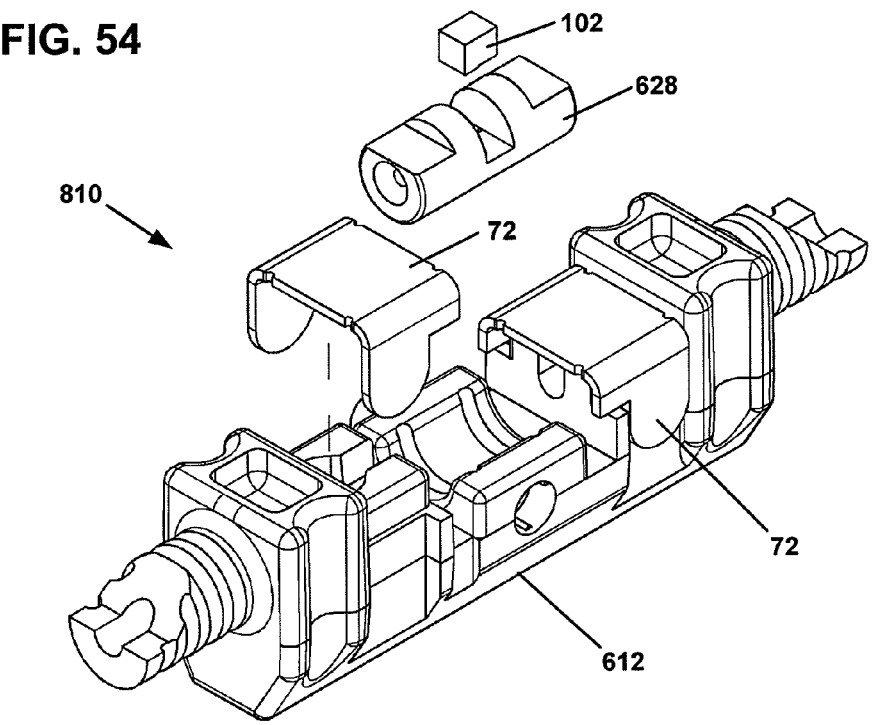
FIG. 54 is an exploded perspective view of another embodiment of a termination assembly having features that are examples of inventive aspects in accordance with the principles of the present disclosure.
Figure 55:
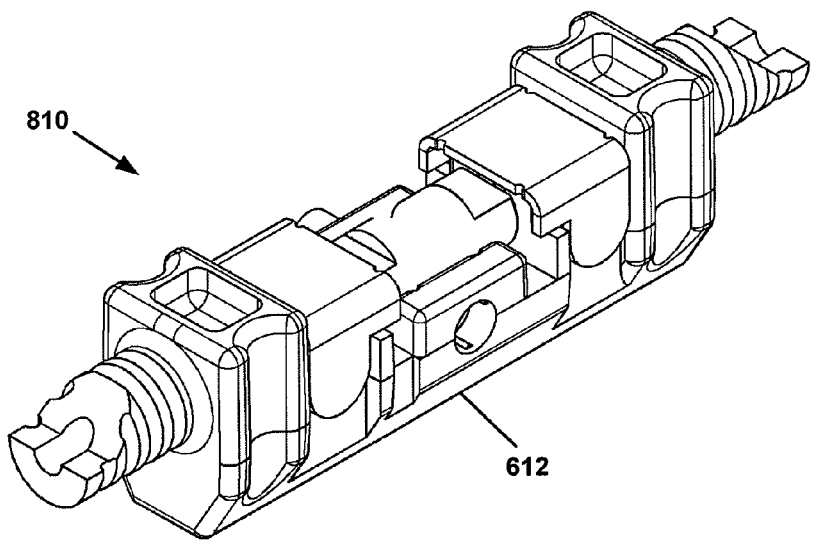
FIG. 55 illustrates the termination assembly of FIG. 54 in a fully assembled configuration.
Figure 56:
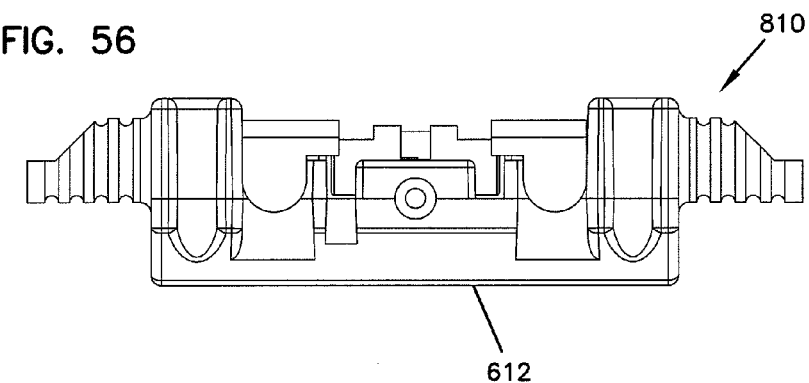
FIG. 56 is a side view of the termination assembly of FIG. 55.
Figure 57:
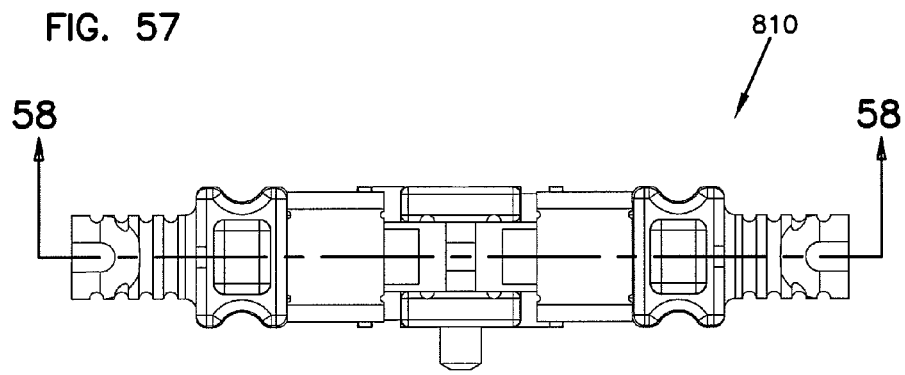
FIG. 57 is a top view of the termination assembly of FIG. 55.
Figure 58:
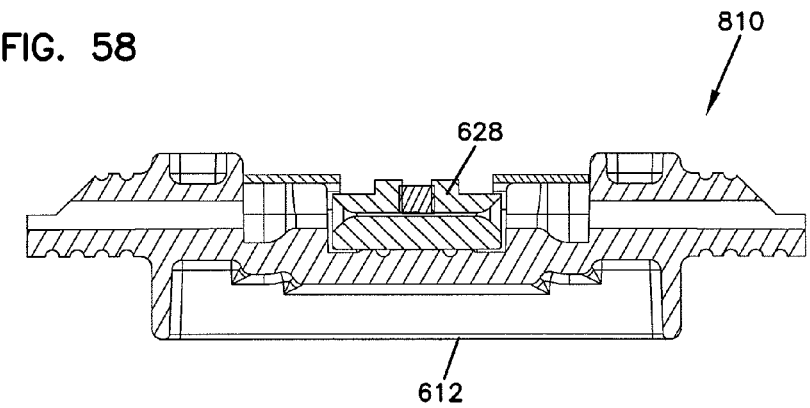
FIG. 58 is a cross-sectional view of the termination assembly taken along line 58-58 of FIG. 57.
Figure 59:
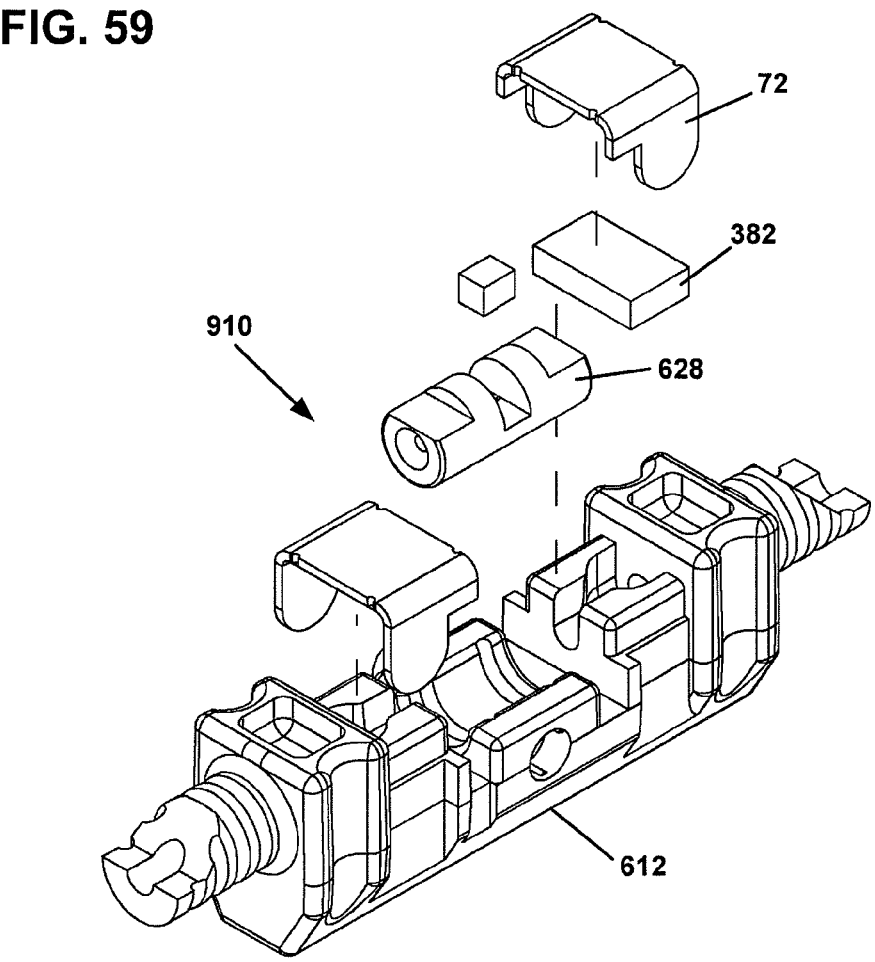
FIG. 59 is an exploded perspective view of yet another embodiment of a termination assembly having features that are examples of inventive aspects in accordance with the principles of the present disclosure.
Figure 60:
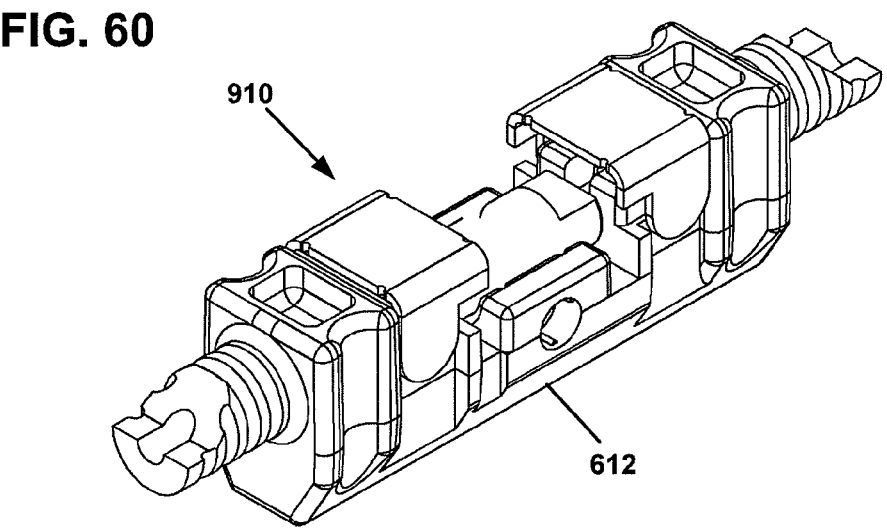
FIG. 60 illustrates the termination assembly of FIG. 59 in a fully assembled configuration.
Figure 61:
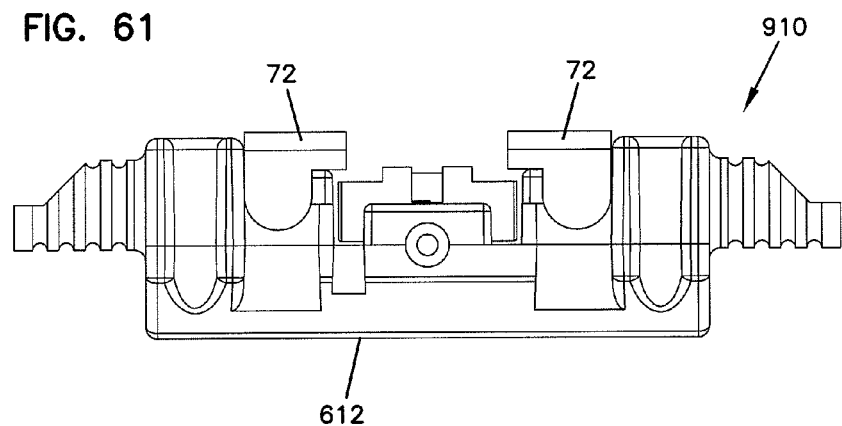
FIG. 61 is a side view of the termination assembly of FIG. 60.
Figure 62:
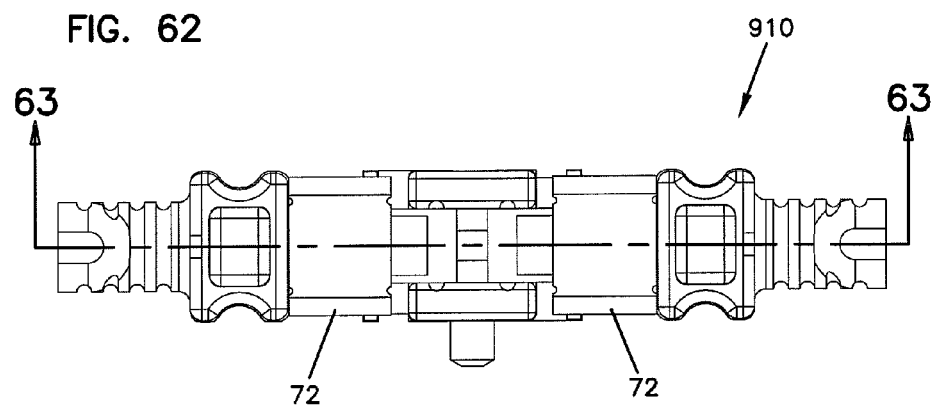
FIG. 62 is a top view of the termination assembly of FIG. 60.
Figure 63:
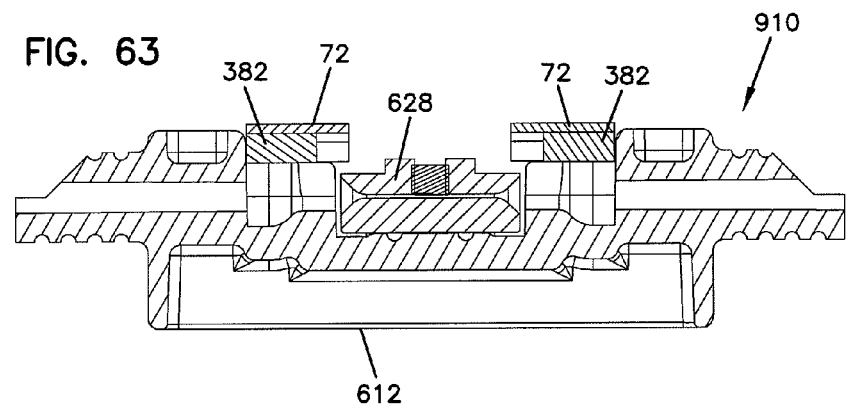
FIG. 63 is a cross-sectional view of the termination assembly taken along line 63-63 of FIG. 62.

As shown in FIGS. 22 and 24 and as discussed with respect to the previous embodiment of the fiber optic connector assembly 10, the cutaway region 114 of the base 100 of the alignment guide 28 is configured to accommodate at least a portion of the saddle 72 as the saddle 72 moves downwardly relative to the carrier 212. When the melted portion of the thermoplastic carrier 212 solidifies, the buffer of the field fiber is sealed to the guide path 256 of the carrier termination region 252, the rear end of the base 100 of the alignment guide 28 is sealed to the groove 254 in the carrier 212, and the field fiber is sealed to the base 100 of the alignment guide 28, securing the entire rear side of the fiber optic termination assembly 210 in correct alignment.

As discussed above, in certain embodiments, the carrier of the fiber optic connector assembly may be manufactured out of a thermoplastic material such as PEI. The carrier may be manufactured from other types of polymeric materials. As also discussed previously, by manufacturing the carrier out of a polymeric material, substantially all of the heat energy from the resistor 80 is initially transferred to the conductive saddle 72 rather than the carrier itself. A carrier made out of a metal material may act as a heat sink and absorb some of the thermal energy from the saddle 72, affecting the heating of the saddle 72, and, thus, affecting the melting of the right and left walls 263, 265. There, however, may be applications in which a metallic carrier is preferred.

It should be noted that, even though a thermoplastic carrier with meltable portions is utilized, the fiber optic connector assembly may still include a heat responsive adhesive element that is used in combination with the thermoplastic carrier. Referring now to FIGS. 25-29, a third embodiment of a fiber optic connector assembly 310 that can be used in terminating at least one optical fiber in the field is shown. The fiber optic connector assembly 310 is similar in construction and use to the fiber optic connector assembly 210 shown in FIGS. 20-24 of the present disclosure, except it further includes a heat responsive adhesive element 382 that is used in addition to the meltable right and left vertical walls 263, 265 of a thermoplastic carrier 212.

The fiber optic connector assembly 310 may utilize the same carrier 212 that is shown and described with respect to the embodiment of FIGS. 20-24. In the fiber optic connector assembly 310 of FIGS. 25-29, the saddle assembly 326 includes the saddle 72 and the resistor 80 with a heat responsive adhesive element 382 configured to be positioned between the saddle 72 and the meltable vertical walls 263, 265 of the carrier 212. In the embodiment shown, the heat responsive element 382 is a glue pellet 383. Although in the depicted embodiment, glue pellet 383 is shown as being generally rectangular, it will be understood by those skilled in the art that other shapes for the glue pellet may be used. For example, the glue pellet may or may not include a preformed channel, depending upon the application.

As in the previous embodiment of the fiber optic connector 10 of FIGS. 1-19, the glue pellet 383 is in thermally conductive contact with the saddle 72, which is in thermally conductive contact with the resistor 80. The first surface 384 of the glue pellet 383 is in contact with a bottom surface 90 of the saddle 72, thereby establishing the thermally conductive contact between the glue pellet 383 and the saddle 72. The resistor 80 is in contact with a top surface 92 of the saddle 72, thereby establishing the thermally conductive contact between the resistor 80 and the saddle 72.

Still referring to FIGS. 25-29, the glue pellet 383 is received between the legs 70 of the saddle 72. The legs 70 are configured to slide within the recesses 268 defined on the sidewalls 264, 266 of the carrier 212. When thermal energy is applied to the saddle 72 through the resistor 80 and both the glue pellet 383 and the right and left vertical walls 263, 265 of the carrier 212 melt, the saddle 72 moves vertically downwardly with respect to the carrier 212 with the legs 70 riding along the recesses 268.

As discussed above, the melting glue 383 and the thermoplastic material are contained and guided toward the center of the carrier 212 into the guide path 256 by the legs 70 of the saddle 72.

Even though the previous embodiments of the fiber optic connector assembly were described as including saddle assemblies that utilized electrical current through a resistor element 80 to melt the thermoplastic material and/or the glue, it should be noted that other various heat application sources may be used. In the above examples, an energy source that directed electrical energy through a resistor 80 that is in contact with a metallic saddle 72 was the main heat source. As electrical current flowed through the resistor 80, heat was generated and passed on to the adjacent saddle 72. As discussed above, the saddle 72 was strategically placed to melt a designated zone of the plastic carrier 212 and the thermal glue if desired.

Referring now to FIGS. 30-34, a fourth embodiment of a fiber optic connector assembly 410 that can be used in terminating at least one optical fiber in the field is shown. The fiber optic connector assembly 410 is similar in construction and use to the fiber optic connector assemblies 210, 310 shown in FIGS. 20-29 of the present disclosure, except that it utilizes a different heat source than those embodiments previously described.

The fiber optic connector assembly 410 includes essentially all of the features of the fiber optic connector assembly of FIGS. 20-24 except for a resistor 80. In the embodiment shown in FIGS. 30-34, a heat element such as a solder iron may be used to apply heat directly to the metallic saddle 72. The thermally conductive metallic saddle 72, then, transfers the heat energy to the vertical walls 263, 265 of the carrier 212 to melt the vertical walls 263, 265.

Tools such as a solder iron may be run through a timing or travel mechanism to control precisely how long the heat source is allowed to melt the thermoplastic material. The addition of a time or a travel mechanism can allow the field technician to consistently apply the same melt parameters continuously over multiple terminations, thus generating repeatable process results.

It should be noted that the use of a solder iron in direct contact with the metallic saddle 72 is simply one example of another heat source that might be used in the termination process. Other heat sources such as other heat generating tools may be used. Certain tools such as a solder iron that is used in direct contact with a metallic saddle 72 can allow low cost heating solutions that would provide the proper melting operation.

Referring now to FIGS. 35-39, a fifth embodiment of a fiber optic connector assembly 510 that can be used in terminating at least one optical fiber in the field is shown. The fiber optic connector assembly 510 is similar in construction and use to the fiber optic connector assemblies 210, 310, and 410 shown in FIGS. 20-34 of the present disclosure.

The fiber optic connector assembly 510 shown in FIGS. 35-39 is similar to the embodiment shown in FIGS. 30-34 in that it is configured to utilize a heat source that is in direct contact with the metallic saddle 72, rather than through a resistor 80. As discussed above, one example of such a heat source may be a solder iron that is used to apply heat directly to the metallic saddle 72.

The fiber optic connector assembly 510 shown in FIGS. 35-39 is also similar to the embodiment shown in FIGS. 25-29 in that the fiber optic connector assembly 510 includes a heat responsive adhesive element 382 that is used in combination with the thermoplastic carrier 212. The fiber optic connector assembly 510 is similar in construction and use to the fiber optic connector assembly 310 shown in FIGS. 25-29 in that it further includes a heat responsive adhesive element 382 depicted as a glue 383 that is used in addition to the meltable right and left vertical walls 263, 265 of a thermoplastic carrier 212.

In the fiber optic connector assembly 510 of FIGS. 35-39, the glue pellet 383 is in thermally conductive contact with the saddle 72. The first surface 384 of the glue pellet 383 is in contact with a bottom surface 90 of the saddle 72, thereby establishing the thermally conductive contact between the glue pellet 383 and the saddle 72. As discussed, a heat source such as a solder iron may be used to apply thermal energy directly to the saddle 72. The solder iron may or may not be used with mechanisms such as a timing or a travel mechanism.

Still referring to FIGS. 35-39, the glue pellet 383 is received between the legs 70 of the saddle 72. The legs 70 are configured to slide within the recesses 268 defined on the sidewalls 264, 266 of the carrier 212. When thermal energy is applied to the saddle 212 directly through a solder iron and both the glue pellet 383 and the right and left vertical walls 263, 265 of the carrier 212 melt and assume a flowable condition, the saddle 72 moves vertically downwardly with respect to the carrier 212 with the legs 70 riding along the recesses 268. As discussed above, the melting glue 383 and the thermoplastic material are contained and guided toward the center of the carrier 212 into the guide path 256 by the legs 70 of the saddle 72.

Although all of the fiber optic connector assemblies disclosed herein have been described as being used to terminate a field fiber to a fiber optic connector, it should be noted that all of the aspects and features of the fiber optic connector assemblies described herein may be used to provide a termination assembly that can be used to terminate a first optical fiber to a second optical fiber, wherein neither of the optical fibers are terminated to a connector 14. One example embodiment of such a termination assembly is described and shown in U.S. patent application entitled "FIELD TERMINATION KIT", filed Apr. 11, 2008, having Ser. No. 12/101,366, the entire disclosure of which has been incorporated herein by reference.

FIGS. 44-73 illustrate different examples of termination assemblies that are used to terminate a first optical fiber to a second optical fiber, wherein the termination assemblies include features and aspects discussed with respect to the fiber optic connector termination assemblies 10, 210, 310, 410, 510 discussed herein.

For example, FIGS. 44-48 illustrate an embodiment of a termination assembly 610 that is used to connect two optical fibers together, wherein the termination assembly 610 includes features similar to those of the embodiment shown in FIGS. 20-24, wherein the carrier 612 is manufactured from a thermoplastic material and includes meltable portions for providing the bonding.

FIGS. 49-53 illustrate another embodiment of a termination assembly 710 that is used to connect two optical fibers together, wherein the termination assembly 710 includes features similar to those of the embodiment shown in FIGS.

25-29, wherein a heat activated adhesive element 382 is utilized in addition to a thermoplastic carrier 612 with meltable portions.

FIGS. 54-58 illustrate another embodiment of a termination assembly 810 that is used to connect two optical fibers together, wherein the termination assembly 810 includes features similar to those of the embodiment shown in FIGS. 30-34, wherein a heat source such as a solder iron may be used to apply heat directly to the saddle 72 rather than through a resistor 80.

FIGS. 59-63 illustrate yet another embodiment of a termination assembly 910 that is used to connect two optical fibers together, wherein the termination assembly 910 includes features similar to those of the embodiment shown in FIGS. 35-39, wherein a heat activated adhesive element 382 is used in combination with a thermoplastic carrier 612 and heat is applied through a heating element such as a solder iron directly to the saddle 72.

Figure 64:
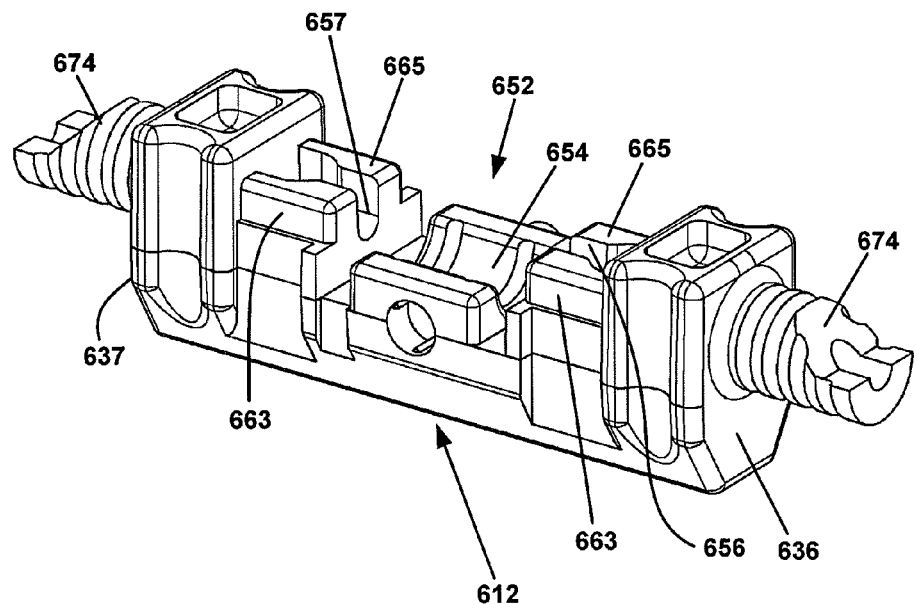
FIG. 64 is a perspective view of a carrier configured for use with each of the termination assemblies shown in FIGS. 44-63.
Figure 65:
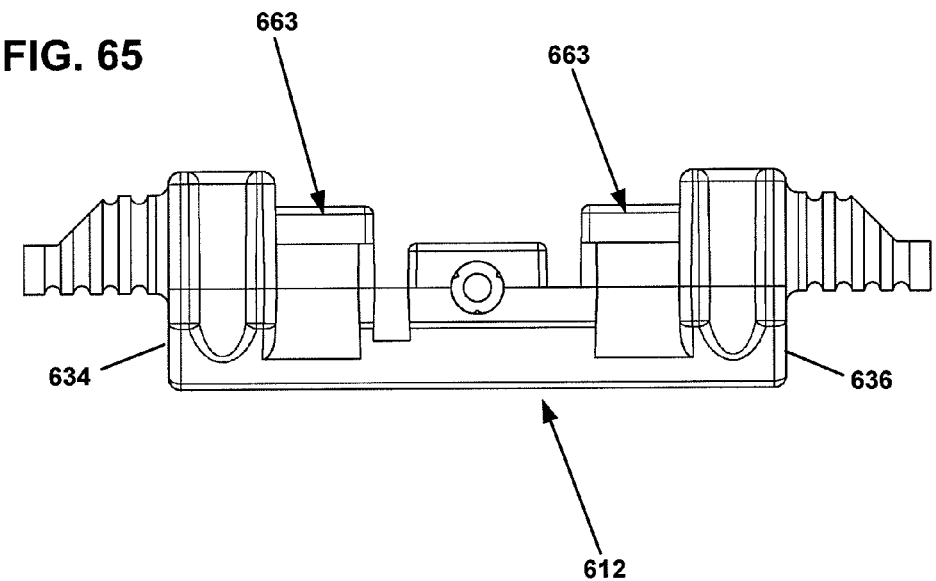
FIG. 65 is a side view of the carrier of FIG. 64.
Figure 66:
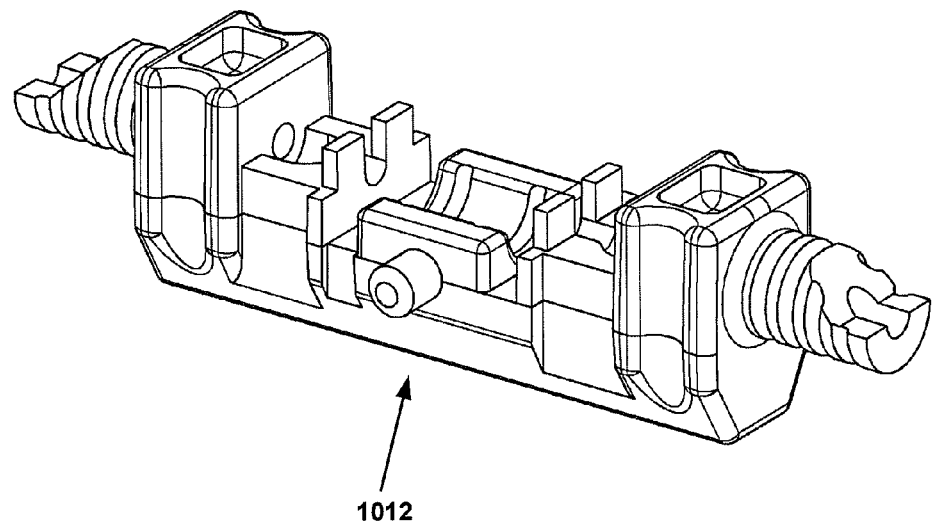
FIG. 66 is a perspective view of another embodiment of a carrier configured for use with a termination assembly for bonding a first optical fiber to another optical fiber, wherein neither of the optical fibers are terminated to a fiber optic connector.
Figure 67:
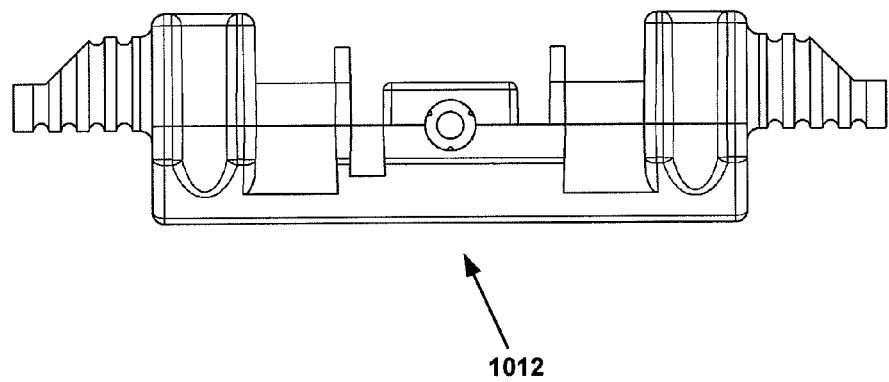
FIG. 67 is a side view of the carrier of FIG. 66.
Figure 68:
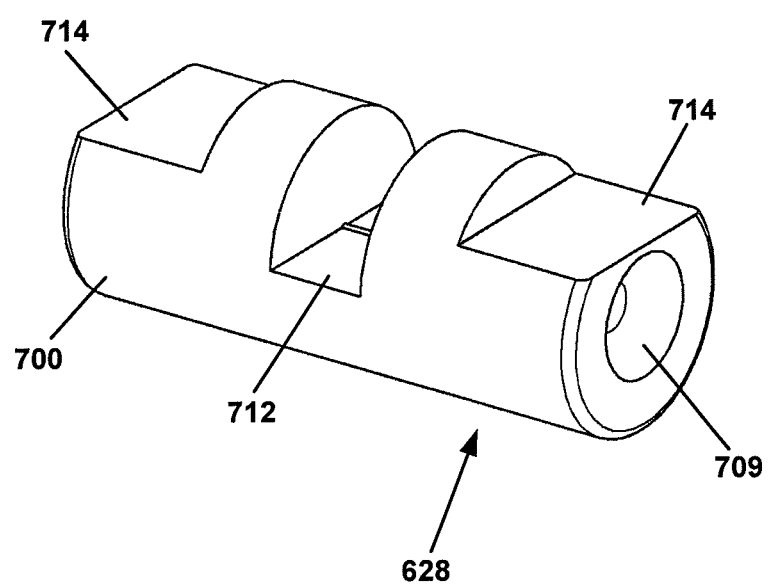
FIG. 68 is a perspective view of a base of an alignment guide configured for use with a termination assembly for bonding a first optical fiber to another optical fiber, wherein neither of the optical fibers are terminated to a fiber optic connector, such as those shown in FIGS. 44-67.
Figure 69:
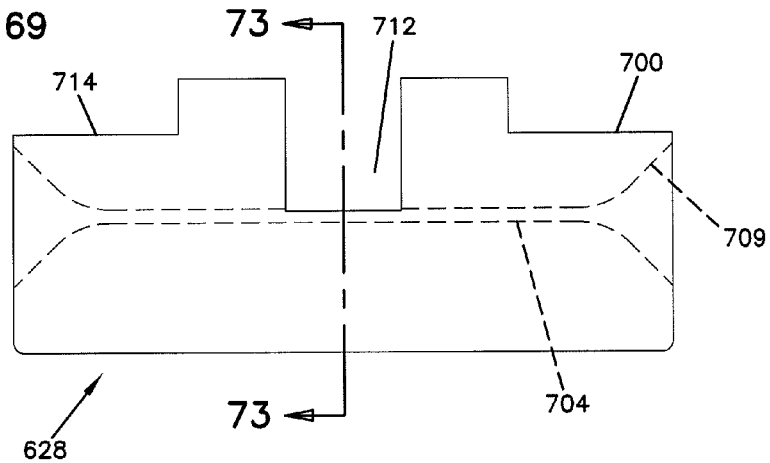
FIG. 69 is a side view of the base of FIG. 68.
Figure 70:
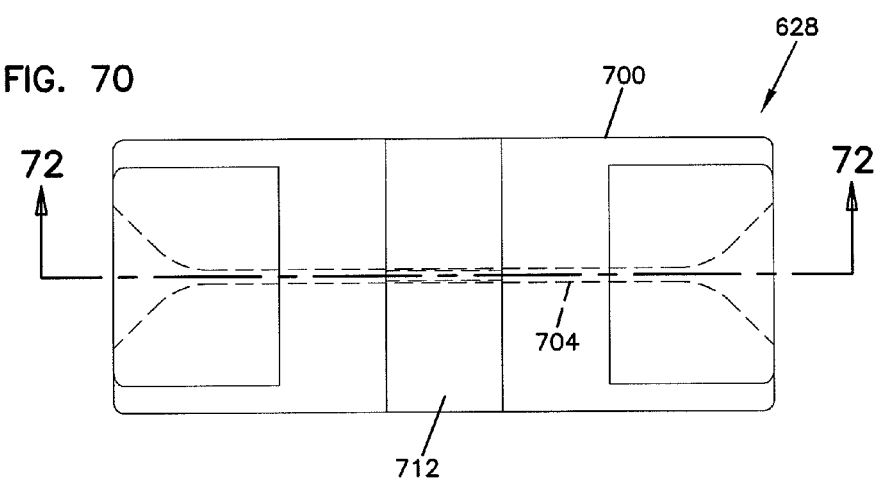
FIG. 70 is a top view of the base of FIG. 68.
Figure 72:
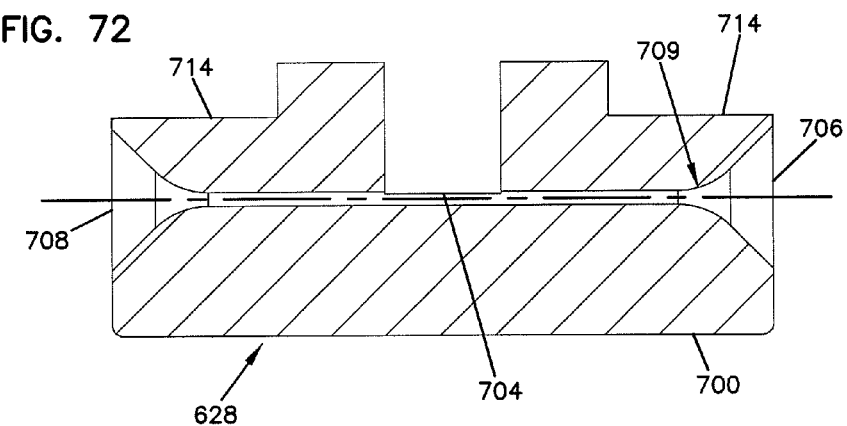
FIG. 72 is a cross-sectional view of the base taken along line 72-72 of FIG. 70.
Figure 71:
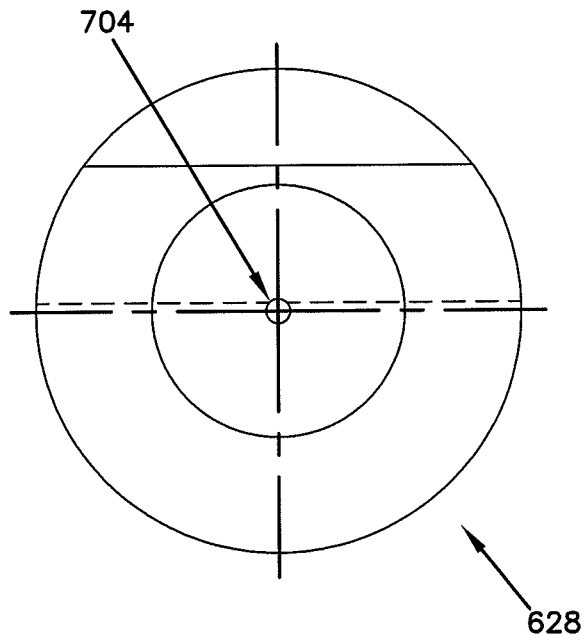
FIG. 71 is a front view of the base of FIG. 68.
Figure 73:
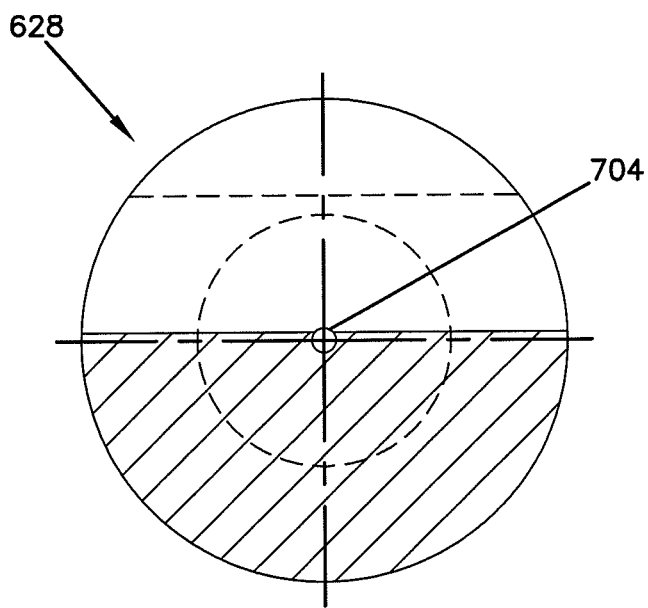
FIG. 73 is a cross-sectional view of the base taken along line 73-73 of FIG. 69.

FIGS. 64-65 illustrate a carrier 612 that can be used with the termination assemblies 610, 710, 810, and 910 shown in FIGS. 44-63. FIGS. 66-67 illustrate a carrier 1012 that does not include thermoplastic meltable portions and which can be used in termination assemblies having features and aspects similar to that shown in FIGS. 1-19.

FIGS. 68-73 illustrate an alignment guide 628 that can be used with the termination assemblies 610, 710, 810, and 910 shown in FIGS. 44-63.

All of the termination assemblies shown in FIGS. 44-73 are similar in construction and use to the fiber optic termination assemblies shown in FIGS. 1-43 except that the termination assemblies shown in FIGS. 44-73 are used to terminate two optical fibers together, wherein neither of the optical fibers are terminated to a fiber optic connector 14.

Referring now to FIGS. 44-73, each of the termination assemblies includes a carrier 612 having a first end 634 and a second end 636. A termination region 652 is disposed between the first and second ends 634, 636. The termination region 652 defines a cavity 654. The cavity 654 is adapted to receive an alignment guide 628 (shown in FIGS. 68-73). The alignment guide 628, as in the previous fiber optic connector termination assemblies, serves as the location for the termination of the optical fibers. The alignment guide 628 includes features similar to those of the alignment guide 28 of FIGS. 7-19, except that it is configured to accommodate saddle assemblies at both ends as shown in FIGS. 68-73.

Similar to the alignment guide 28 shown in FIGS. 7-19, the alignment guide 628 of FIGS. 68-73 includes a base 700 and an alignment window 102 that is separately mounted on the base 700. The base 700 is generally cylindrical in shape and defines a throughhole 704 extending from a first end 706 to the second end 708. At each end, the base 700 defines a conical portion 709. The conical portions 709 taper from a larger diameter portion adjacent the ends toward a small diameter portion toward the center of the base 700. The conical portions 709 are configured to facilitate insertion of the optical fibers into the base 700.

The alignment guide 628 also includes a cutout portion 712 about halfway along the length of the base 700. The cutout 712 accommodates the window 102 (see FIGS. 7, 8, 10, and 17-19) that is placed on the base 700. The cutout 712 is configured to expose and communicate with the throughhole 704 extending from the first end 706 to the second end 708 of the base 700.

As discussed, the base 700 also includes a cutaway region 714 adjacent both the first and the second end. Each cutaway region 714 is configured to accommodate a portion of the saddle 72 when the saddle 72 moves vertically downwardly, either due to the melting of the glue 383, the melting of the vertical walls 663, 665 of the thermoplastic carrier 612, or both. When the saddle 72 comes to rest, the bottom surface 90 of the saddle 72 may rest on the cutaway region 714 on each end of the base 700.

The termination region 652 of the carrier 612 defines a first guide path 656 that extends from the first end 706 of the alignment guide 628 (when the alignment guide is in place) to a first cable end 636 of the carrier 612 and a second guide path 657 that extends from the second end 708 of the alignment guide 628 (when the alignment guide is in place) to a second cable end 637 of the carrier 612.

In the carriers 612 used with the embodiments shown in FIGS. 44-73, crimp tubes 674 are engaged with both the first and second ends 636, 637 of the carrier 612. The crimp tubes 674 define passageways through which the optical fibers are inserted at both ends of the carrier 612.

As shown in FIGS. 44-73, a saddle assembly is positioned adjacent each of the first and second cable ends 636, 637 of the carrier 612. Each of the saddle assemblies may include features similar to and are used in a manner similar to those embodiments described with respect to FIGS. 1-43.

For example, in the embodiment of the termination assembly 610 shown in FIGS. 44-48, the carrier 612 is manufactured from a thermoplastic material and includes meltable portions for providing the bonding and the saddle assembly includes a resistor 80.

In the embodiment of the termination assembly 710 of FIGS. 49-53, a heat activated adhesive element 382 is utilized in addition to a thermoplastic carrier 612 with meltable portions.

In the embodiment of the termination assembly 810 of FIGS. 54-58, the saddle assembly does not include a resistor 80 and a heat source such as a solder iron may be used to apply heat directly to the saddle 72.

In the embodiment of the termination assembly 910 of FIGS. 59-63, a heat activated adhesive element 382 is used in combination with a thermoplastic carrier 612 and heat is applied through a heating element such as a solder iron directly to the saddle 72, rather than through a resistor 80.

Various modifications and alterations of this disclosure will become apparent to those skilled in the art without departing from the scope and spirit of this disclosure, and it should be understood that the inventive features are not to be unduly limited to the illustrative embodiments set forth herein.

The invention claimed is:

1. A fiber optic connector assembly comprising:
   a fiber optic connector having a first mating end and a second end;
   a first optical fiber terminated to the fiber optic connector, the first optical fiber defining a first end adjacent the mating end for optical connection to a second fiber optic connector, the first optical fiber defining a second end protruding out of the second end of the fiber optic connector;
   a polymeric carrier having a connector end engaged with the fiber optic connector and an oppositely disposed cable end, the polymeric carrier including a heat activated meltable portion adjacent the cable end; and
   an alignment structure disposed on the carrier, the alignment structure including a first end and a second end and a throughhole extending from the first end to the second end, the first end of the alignment structure configured to receive the second end of the first optical fiber and the second end of the alignment structure configured to receive an end of a second optical fiber entering the cable end of the carrier;

wherein the heat activated portion of the polymeric carrier is configured to melt and assume a flowable condition when exposed to a predetermined amount of heat and resolidify when the heat is removed to bond the second optical fiber to the carrier;

wherein the carrier defines a guide path adjacent the cable end for receiving the end of the second optical fiber entering the cable end, the heat activated meltable portion of the carrier including first and second parallel vertical walls surrounding the guide path.

2. A fiber optic connector assembly according to claim 1, further comprising a heat activated adhesive element positioned adjacent the meltable portion of the polymeric carrier, the heat activated adhesive element also configured to melt and assume a flowable condition when exposed to a predetermined amount of heat and resolidify when the heat is removed for bonding the second optical fiber to the carrier.

3. A fiber optic connector assembly according to claim 2, further comprising a resistor in thermal conductive contact with a conductive element positioned on the heat activated adhesive element, the conductive element configured to transfer heat from the resistor to the heat activated adhesive element and the meltable portion of the polymeric carrier, the conductive element configured to move with respect to the carrier when the heat activated adhesive element and the meltable portion of the carrier melt and assume a flowable condition.

4. A fiber optic assembly according to claim 1, wherein the alignment structure includes a cutaway portion extending generally perpendicularly to and communicating with the throughhole, the first optical fiber terminated to the fiber optic connector being positioned within at least a portion of the throughhole with the second end of the first optical fiber located within the cutaway portion of the alignment structure, wherein a window is disposed within the cutaway portion of the alignment structure over the second end of the first optic fiber, the window configured for visually inspecting an alignment of the second end of the first optical fiber with the end of the second optical fiber entering the cable end of the carrier.

5. A fiber optic connector assembly according to claim 4, wherein the window is made out of pyrex material.

6. A fiber optic connector assembly according to claim 1, further comprising a resistor in thermal conductive contact with a conductive element positioned on the meltable portion of the carrier, the conductive element configured to transfer heat from the resistor to the meltable portion of the polymeric carrier, the conductive element configured to move with respect to the carrier when the meltable portion of the carrier melts and assumes a flowable condition.

7. A fiber optic connector assembly according to claim 1, wherein the alignment structure is generally cylindrical in shape.

8. A fiber optic connector assembly according to claim 1, wherein the alignment structure includes a conical portion on at least the first end and the second end of the alignment structure.

9. A method of terminating a factory optical fiber to a field optical fiber comprising:

terminating the factory optical fiber to the fiber optic connector with an end of the factory optical fiber protruding from the fiber optic connector;

providing a polymeric carrier having a connector end engaged with the fiber optic connector and an oppositely disposed cable end, the polymeric carrier including a heat activated meltable portion adjacent the cable end;

providing an alignment structure on the polymeric carrier, the alignment structure including a first end and a second end and a throughhole extending from the first end to the second end;

inserting the factory optical fiber protruding from the fiber optic connector into the throughhole of the alignment structure from the first end of the alignment structure;

inserting the field optical fiber into the throughhole of the alignment structure from the second end of the alignment structure;

aligning an end of the field optical fiber with the end of the factory optical fiber within the throughhole of the alignment structure;

providing heat to the heat activated meltable portion of the polymeric carrier to melt and bring the carrier to a flowable condition for securing the factory optical fiber to the field optical fiber; and providing a heat activated adhesive element adjacent the meltable portion of the polymeric carrier, the heat activated adhesive element configured to melt and assume a flowable condition when exposed to a predetermined amount of heat and resolidify when the heat is removed for bonding the factory optical fiber to the field optical fiber.

10. A method according to claim 9, further comprising removing the heat from the meltable portion of the carrier to allow the meltable portion to resolidify to secure the factory optical fiber to the field optical fiber.

11. A method according to claim 9, wherein the alignment structure includes a cutaway portion extending generally perpendicularly to and communicating with the throughhole, the method further comprising inserting the factory optical fiber protruding from the fiber optic connector into the throughhole of the alignment structure from the first end with the end of the factory optical fiber positioned within the cutaway portion of the alignment structure and providing a window within the cutaway portion of the alignment structure over the ends of the factory and field optical fibers for visually inspecting an alignment of the optical fibers.

12. A method according to claim 11, wherein the window is made out of pyrex material.

13. A method according to claim 9, further comprising providing a resistor in thermal conductive contact with a conductive element positioned on the heat activated adhesive element, the conductive element configured to transfer heat from the resistor to the heat activated adhesive element and the meltable portion of the polymeric carrier.

14. A method according to claim 9, further comprising providing a resistor in thermal conductive contact with a conductive element positioned on the meltable portion of the carrier, the conductive element configured to transfer heat from the resistor to the meltable portion of the polymeric carrier.

15. A method according to claim 9, wherein the alignment structure is generally cylindrical in shape and includes a conical portion on at least the first end and the second end of the alignment structure.

16. A fiber optic connector assembly comprising:

a fiber optic connector having a first mating end and a second end;

a first optical fiber terminated to the fiber optic connector, the first optical fiber defining a first end adjacent the mating end for optical connection to a second fiber optic connector, the first optical fiber defining a second end protruding out of the second end of the fiber optic connector;

a polymeric carrier having a connector end engaged with the fiber optic connector and an oppositely disposed cable end, the polymeric carrier including a heat activated meltable portion adjacent the cable end; and an alignment structure disposed on the carrier, the alignment structure including a first end and a second end and a throughhole extending from the first end to the second end, the first end of the alignment structure configured to receive the second end of the first optical fiber and the second end of the alignment structure configured to receive an end of a second optical fiber entering the cable end of the carrier;

wherein the heat activated portion of the polymeric carrier is configured to melt and assume a flowable condition when exposed to a predetermined amount of heat and resolidify when the heat is removed to bond the second optical fiber to the carrier;

wherein a heat activated adhesive element is positioned adjacent the meltable portion of the polymeric carrier, the heat activated adhesive element also configured to melt and assume a flowable condition when exposed to a predetermined amount of heat and resolidify when the heat is removed for bonding the second optical fiber to the carrier.

17. A fiber optic connector assembly according to claim 16, further comprising a resistor in thermal conductive contact with a conductive element positioned on the heat activated adhesive element, the conductive element configured to transfer heat from the resistor to the heat activated adhesive element and the meltable portion of the polymeric carrier, the conductive element configured to move with respect to the carrier when the heat activated adhesive element and the meltable portion of the carrier melt and assume a flowable condition.

* * * * *

UNITED STATES PATENT AND TRADEMARK OFFICE
CERTIFICATE OF CORRECTION

PATENT NO.         : 8,573,858 B2                                    Page 1 of 1
APPLICATION NO.    : 12/789139
DATED              : November 5, 2013
INVENTOR(S)        : Skluzacek et al.

It is certified that error appears in the above-identified patent and that said Letters Patent is hereby corrected as shown below:

In the Specification

Col. 8, line 4: "is accurately shaped" should read --is arcuately shaped--

Signed and Sealed this
Seventh Day of October, 2014

Michelle K. Lee
*Deputy Director of the United States Patent and Trademark Office*